United States Patent
Makuta

(10) Patent No.: US 12,049,568 B2
(45) Date of Patent: Jul. 30, 2024

(54) INK SET AND IMAGE FORMATION METHOD

(71) Applicant: FUJIFILM CORPORATION, Tokyo (JP)

(72) Inventor: Toshiyuki Makuta, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 562 days.

(21) Appl. No.: 17/239,698

(22) Filed: Apr. 26, 2021

(65) Prior Publication Data

US 2021/0253888 A1 Aug. 19, 2021

Related U.S. Application Data

(63) Continuation of application No. PCT/JP2019/040613, filed on Oct. 16, 2019.

(30) Foreign Application Priority Data

Nov. 2, 2018 (JP) ................................ 2018-207757

(51) Int. Cl.
| | | |
|---|---|---|
| C09D 11/54 | (2014.01) | |
| B41J 2/21 | (2006.01) | |
| B41M 5/00 | (2006.01) | |
| C09D 11/102 | (2014.01) | |
| C09D 11/322 | (2014.01) | |

(52) U.S. Cl.
CPC .............. C09D 11/54 (2013.01); B41J 2/21 (2013.01); B41J 2/2107 (2013.01); B41M 5/0023 (2013.01); C09D 11/102 (2013.01); C09D 11/322 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2007/0024686 A1 | 2/2007 | Kadomatsu et al. | |
| 2009/0244116 A1* | 10/2009 | Ohnishi | C09D 11/322 347/6 |
| 2010/0020123 A1* | 1/2010 | Hirato | B41J 29/393 347/19 |
| 2013/0016156 A1 | 1/2013 | Yasufumi et al. | |
| 2014/0132685 A1 | 5/2014 | Amao et al. | |
| 2015/0124031 A1 | 5/2015 | Iijima et al. | |
| 2016/0250861 A1 | 9/2016 | Yano et al. | |
| 2017/0145238 A1* | 5/2017 | Parazak | B41J 2/01 |
| 2018/0016453 A1* | 1/2018 | Chen | C09D 11/30 |
| 2018/0079222 A1 | 3/2018 | Yano et al. | |
| 2018/0194956 A1* | 7/2018 | Abelovski | C09D 11/322 |
| 2018/0257417 A1 | 9/2018 | Ushiyama et al. | |
| 2019/0023928 A1 | 1/2019 | Kamada et al. | |

FOREIGN PATENT DOCUMENTS

| | | |
|---|---|---|
| CN | 102822288 A | 12/2012 |
| CN | 105922778 A | 9/2016 |
| EP | 2840119 A1 | 2/2015 |
| EP | 3388490 A1 | 10/2018 |
| GB | 2540011 A | 1/2017 |
| JP | 2006-123542 A | 5/2006 |
| JP | 2007030464 A | 2/2007 |
| JP | 2013-18846 A | 1/2013 |
| JP | 2016-179675 A | 10/2016 |
| JP | 2016-190959 A | 11/2016 |
| JP | 2017-155137 A | 9/2017 |
| JP | 2018-149735 A | 9/2018 |
| WO | 2013/157271 A1 | 10/2013 |
| WO | 2014/188209 A1 | 11/2014 |
| WO | 2017/169371 A1 | 10/2017 |

OTHER PUBLICATIONS

International Search Report issued in International Application No. PCT/JP2019/040613 on Dec. 3, 2019.

(Continued)

*Primary Examiner* — Manish S Shah

(74) *Attorney, Agent, or Firm* — SOLARIS Intellectual Property Group, PLLC

(57) ABSTRACT

An ink set including a color ink containing particles including a polymerizable compound, a colorant, and water and an overcoat solution containing particles including a polymerizable compound and water, and an image formation method.

16 Claims, No Drawings

(56) References Cited

OTHER PUBLICATIONS

Written Opinion of the ISA issued in International Application No. PCT/JP2019/040613 on Dec. 3, 2019.
Extended European Search Report dated Jan. 10, 2022, issued in corresponding EP Patent Application No. 19878528.9.
English language translation of the following: Office action dated Apr. 1, 2022 from the SIPO in a Chinese patent application No. 201980071836.1 corresponding to the instant patent application. This office action translation is submitted now in order to supplement the understanding of the cited references which are being disclosed in the instant Information Disclosure Statement.
English language translation of the following: Office action dated Oct. 14, 2022 from the SIPO in a Chinese patent application No. 201980071836.1 corresponding to the instant patent application.
English language translation of the following: Office action dated May 24, 2022 from the JPO in a Japanese patent application No. 2020-553760 corresponding to the instant patent application. This office action translation is submitted now in order to supplement the understanding of the cited references which are being disclosed in the instant Information Disclosure Statement.

\* cited by examiner

INK SET AND IMAGE FORMATION METHOD

CROSS-REFERENCE TO RELATED APPLICATIONS

This application is a continuation application of International Application No. PCT/JP2019/040613, filed Oct. 16, 2019, the disclosure of which is incorporated herein by reference in its entirety. Further, this application claims priority from Japanese Patent Application No. 2018-207757, filed Nov. 2, 2018, the disclosure of which is incorporated herein by reference in its entirety.

BACKGROUND OF THE INVENTION

1. Field of the Invention

The present disclosure relates to an ink set and an image formation method.

2. Description of the Related Art

As inks having curability, inks containing polymerizable compounds have been studied.

For example, WO2014/188209A discloses an ink jet ink containing (i) an organic solvent contained in an amount of 30 wt % or more relative to the total ink amount, (ii) a radiation-curable oligomer and/or a radiation-curable polyfunctional monomer, (iii) a photopolymerization initiator, (iv) a colorant contained in an amount of 10 wt % or less relative to the total ink amount, and (v) a thermoplastic resin contained in an amount of 8 wt % to 25 wt % relative to the total ink amount and having a weight-average molecular weight of 1500 to 70000.

In addition, JP2006-123542A discloses an ink jet recording method using an ink composition set composed of an ink composition A containing at least a colorant and polymerizable compounds, and an ink composition B at least containing a photopolymerization initiator and polymerizable compounds, the method causing the ink composition A and the ink composition B to adhere to a recording medium, and performing irradiation with ultraviolet radiation to achieve printing, wherein the polymerizable compounds contained in the ink composition A are a monofunctional monomer and a bifunctional monomer, and the polymerizable compounds contained in the ink composition B are a monofunctional monomer, a bifunctional monomer, and a polyfunctional monomer and/or oligomer.

SUMMARY OF THE INVENTION

Instead of inks containing organic solvents (for example, the ink described in WO2014/188209A), from the viewpoint of reduction in VOC (Volatile Organic Compounds), inks containing water are desired in some cases.

As such a water-containing ink that is of a curable type, an ink containing water and a water-soluble polymerizable compound may be employed.

However, some inks containing water and a water-soluble polymerizable compound have poor liquid stability. For example, during storage of such an ink, the water-soluble polymerizable compound dissolving in the ink polymerizes to generate precipitate in some cases.

Thus, an ink that contains water and a polymerizable compound and that has high liquid stability is desired in some cases.

When an ink mainly containing a polymerizable monomer (for example, the ink described in JP2006-123542A) is used to form an image on a substrate having surface irregularities (for example, leather having surface irregularities referred to as grains), the surface of the formed image appears not to have the surface-irregularity texture of the underlying substrate. This is inferentially because the ink mainly containing a polymerizable monomer provides an image having a large film thickness, compared with cases of using inks mainly containing a solvent.

Thus, in some cases, an image formed from an ink is required to have a property of retaining, in the image surface, the surface-irregularity texture of the substrate (hereafter, also referred to as "surface-irregularity-texture retainability").

Furthermore, in some cases, an image formed from an ink is required to have resistance to rubbing (namely, rubfastness).

The present disclosure has been made under such circumstances.

An object of an embodiment of the present disclosure is to provide an ink set that includes a color ink containing water and a polymerizable compound and having high liquid stability, and an overcoat solution containing water and a polymerizable compound and having high liquid stability, and that enables formation of an overcoat-layer-equipped color image having high surface-irregularity-texture retainability of retaining the surface-irregularity texture of the substrate and high rubfastness.

An object of another embodiment of the present disclosure is to provide an image formation method that enables formation of an overcoat-layer-equipped color image having high surface-irregularity-texture retainability of retaining the surface-irregularity texture of the substrate and high rubfastness.

Specific means for achieving the objects include the following embodiments.

<1> An ink set including:
 a color ink containing particles including a polymerizable compound, a colorant, and water, and
 an overcoat solution containing particles including a polymerizable compound and water.

<2> The ink set according to <1>, wherein the particles in the color ink include a polymerizable polymer.

<3> The ink set according to <2>, wherein the polymerizable polymer in the color ink includes polymerizable polyurethane.

<4> The ink set according to <2> or <3>, wherein the polymerizable polymer in the color ink has a weight-average molecular weight of 1000 to 30000.

<5> The ink set according to any one of <1> to <4>, wherein the particles in the overcoat solution include a polymerizable polymer.

<6> The ink set according to <5>, wherein the polymerizable polymer in the overcoat solution includes polymerizable polyurethane.

<7> The ink set according to <5> or <6>, wherein the polymerizable polymer in the overcoat solution has a weight-average molecular weight of 1000 to 30000.

<8> The ink set according to any one of <1> to <7>, being used for image formation on leather.

<9> The ink set according to any one of <1> to <8>, wherein the overcoat solution has a surface tension lower than a surface tension of the color ink.

<10> The ink set according to any one of <1> to <9>, wherein $C_{OP}$ representing a percent by mass of the polymerizable compound in the overcoat solution is larger than $C_{IP}$ representing a percent by mass of the polymerizable compound in the color ink.

<11> The ink set according to any one of <1> to <10>, wherein the color ink further contains a polymerization initiator, and the overcoat solution further contains a polymerization initiator.

<12> The ink set according to <11>, wherein at least one of the polymerization initiator in the color ink or the polymerization initiator in the overcoat solution includes a compound represented by Formula (X) below.

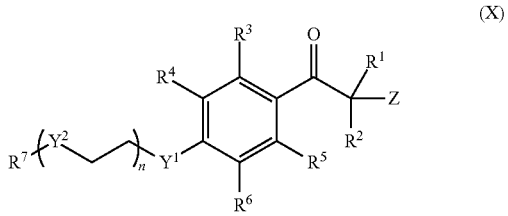

In Formula (X), $R^1$ and $R^2$ each independently represent an alkyl group; $R^3$, $R^4$, $R^5$, and $R^6$ each independently represent a hydrogen atom or a substituent; $R^7$ represents a hydrogen atom, an alkyl group, an acyl group, or a trialkylsilyl group; Z represents a hydroxy group, an alkoxy group, or an alkylamino group; $Y^1$ and $Y^2$ each independently represent an oxygen atom or a sulfur atom; and n represents an integer of 1 to 3.

<13> The ink set according to any one of <1> to <12>, further including an aggregating solution containing water and an aggregating agent for aggregating a component in the color ink.

<14> An image formation method using the ink set according to any one of <1> to <12>, the method including:
a step of applying, onto a substrate, the color ink to form a color image; and
a step of applying, onto at least the color image on the substrate, the overcoat solution to form an overcoat layer.

<15> The image formation method according to <14>, wherein the step of forming the color image includes applying, onto the substrate, the color ink, drying and subsequently curing the applied color ink to form the color image, and
the step of forming the overcoat layer includes applying, onto at least the color image on the substrate, the overcoat solution, drying and subsequently curing the applied overcoat solution to form the overcoat layer.

<16> An image formation method using the ink set according to <13>, the method including:
a step of applying, onto a substrate, the aggregating solution;
a step of applying, onto a surface of the applied aggregating solution on the substrate, the color ink to form a color image; and
a step of applying, onto at least the color image on the substrate, the overcoat solution to form an overcoat layer.

<17> The image formation method according to <16>, wherein the step of forming the color image includes applying, onto the surface of the applied aggregating solution on the substrate, the color ink, drying and subsequently curing the applied color ink, to form the color image, and
the step of forming the overcoat layer includes applying, onto at least the color image on the substrate, the overcoat solution, drying and subsequently curing the applied overcoat solution, to form the overcoat layer.

<18> The image formation method according to any one of <14> to <17>, wherein, in the step of forming the overcoat layer, a solid-content application amount of the overcoat solution is 1 $g/m^2$ or more.

An embodiment of the present disclosure provides an ink set that includes a color ink containing water and a polymerizable compound and having high liquid stability, and an overcoat solution containing water and a polymerizable compound and having high liquid stability, and that enables formation of an overcoat-layer-equipped color image having high surface-irregularity-texture retainability of retaining the surface-irregularity texture of the substrate and high rubfastness.

Another embodiment of the present disclosure provides an image formation method that enables formation of an overcoat-layer-equipped color image having high surface-irregularity-texture retainability of retaining the surface-irregularity texture of the substrate and high rubfastness.

DESCRIPTION OF THE PREFERRED EMBODIMENTS

In the present disclosure, ranges defined by "a value 'to' another value" include the value and the other value respectively as the minimum value and the maximum value.

In the present disclosure, the amount of each of components in a composition means, when the composition contains a plurality of substances belonging to such a component, the total amount of the plurality of substances in the composition unless otherwise specified.

In the present disclosure, among ranges described in series, the upper limit value or the lower limit value of a range may be replaced by the upper limit value or the lower limit value of one of other ranges described in series, or may be replaced by a value described in Examples.

In this Specification, the term "step" includes not only an independent step, but also a step that is not clearly distinguished from another step but that achieves the intended result of the step.

In the present disclosure, "photo" in terms such as "photopolymerization" is a concept that encompasses actinic energy rays such as γ-rays, β-rays, electron beams, ultraviolet radiation, and visible radiation.

In the present disclosure, "(meth)acrylic" is a concept encompassing both of acrylic and methacrylic; "(meth)acrylate" is a concept encompassing both of acrylate and methacrylate; and "(meth)acryloyl group" is a concept encompassing both of an acryloyl group and a methacryloyl group.

Ink Set

An ink set according to the present disclosure includes a color ink containing particles including a polymerizable compound, a colorant, and water, and an overcoat solution containing particles including a polymerizable compound and water.

The ink set according to the present disclosure enables formation of an overcoat-layer-equipped color image having high surface-irregularity-texture retainability of retaining the surface-irregularity texture of the substrate and high rubfastness.

In the ink set according to the present disclosure, each of the color ink and the overcoat solution contains water and a polymerizable compound, and has high liquid stability.

Such advantages are provided inferentially for the following reasons. However, the ink set according to the present disclosure is not limited by the following reasons.

The reasons for enabling formation of an overcoat-layer-equipped color image having high rubfastness are inferred as follows: the ink set includes an overcoat solution, so that an overcoat layer for covering a color image formed from a color ink can be formed; in addition, the color ink and the overcoat solution each contain a polymerizable compound, so that a cured color image and a cured overcoat layer can be formed.

The phrase "the overcoat-layer-equipped color image has high rubfastness" means that the overcoat-layer-equipped color image, upon rubbing, undergoes less change in the density of the color image.

Specifically, the concept that the overcoat-layer-equipped color image has high rubfastness encompasses, upon rubbing of the overcoat-layer-equipped color image, a case where the overcoat layer serving as the upper layer itself undergoes less damage, and a case where the overcoat layer is damaged to some extent but the color image serving as the lower layer undergoes less change in the density.

The reason for enabling formation of an overcoat-layer-equipped color image having high surface-irregularity-texture retainability is inferred as follows: the color ink and the overcoat solution each contain a solvent (specifically, water), to thereby enable formation of an image having a small film thickness (specifically, an overcoat-layer-equipped color image), compared with cases of using inks mainly containing a polymerizable monomer.

The reason why the color ink has high liquid stability is inferred as follows: the polymerizable compound contained in the color ink is not present in a state of dissolving in the color ink, but is present in a state of being included in the particles; thus, even when polymerization of the polymerizable compound proceeds during storage of the color ink, the polymer generated by this polymerization is less likely to precipitate. On the other hand, when the polymerizable compound contained in the color ink is present in a state of dissolving in the color ink, and polymerization of the polymerizable compound proceeds during storage of the color ink, the polymer generated by the polymerization inferentially becomes more likely to precipitate.

This advantage of liquid stability is inferentially exerted effectively, in particular, when the color ink is stored under an environment where polymerization accelerates (for example, under an oxygen-deficient atmosphere).

The reason why the overcoat solution has high liquid stability is inferentially the same as the reason why the color ink has high liquid stability.

The ink set according to the present disclosure is suitably used for image formation on a substrate having surface irregularities (specifically, formation of an overcoat-equipped color image).

The substrate having surface irregularities is preferably leather. The leather has surface irregularities referred to as grains.

Examples of the leather include natural leather (also referred to as "real leather"), synthetic leather (such as PVC (polyvinyl chloride) leather and PU (polyurethane) leather).

For leather, for example, reference can be made to Paragraph 0163 to Paragraph 0165 of JP2009-058750A.

When the ink set according to the present disclosure is used for image formation on leather, the advantages of surface-irregularity-texture retainability and rubfastness are more effectively exerted.

From such a viewpoint, the ink set according to the present disclosure is particularly suitable for applications of image formation on leather products (for example, seats for vehicles, bags, shoes, and wallets).

As described above, the ink set according to the present disclosure includes a color ink and an overcoat solution.

The ink set according to the present disclosure may include a single color ink alone or may include two or more color inks.

The ink set according to the present disclosure may include a single overcoat solution alone or may include two or more overcoat solutions.

One of preferred embodiments of the ink set according to the present disclosure is, for example, an embodiment in which two or more color inks and one or more overcoat solutions are included.

Such an embodiment enables formation of a multicolor image.

The following are examples of the two or more color inks:
three color inks composed of a cyan ink, a magenta ink, and a yellow ink;
four color inks composed of a cyan ink, a magenta ink, a yellow ink, and a black ink;
four or more color inks composed of the above-described three color inks and at least one selected from the group consisting of a white ink, a green ink, an orange ink, a light cyan ink, a light magenta ink, and a light yellow ink; and
five or more color inks composed of the above-described four color inks and at least one selected from the group consisting of a white ink, a green ink, an orange ink, a light cyan ink, a light magenta ink, and a light yellow ink.

However, the two or more color inks are not limited to these specific examples.

Such a color ink is preferably, from the viewpoint of, for example, an increase in the speed of image formation and image sharpness, an ink jet color ink (specifically, a color ink to be applied by an ink jet process).

Such an overcoat solution is preferably, from the viewpoint of, for example, an increase in the speed of overcoat-layer formation, an ink jet overcoat solution (specifically, an overcoat solution to be applied by an ink jet process).

Hereinafter, the overcoat solution and the color ink included in the ink set according to the present disclosure will be described.

Color Ink

The color ink contains particles including a polymerizable compound, a colorant, and water.

The color ink is a liquid for forming a color image.

Particles Including Polymerizable Compound

The color ink contains particles including a polymerizable compound (hereafter, also referred to as "Specified particles I").

Specified particles I may include one polymerizable compound alone or two or more polymerizable compounds.

Specified particles I may be particles composed of a polymerizable compound, or particles including a polymerizable compound and another component.

The polymerizable compound is a compound having a polymerizable group.

The polymerizable group is preferably a radical-polymerizable group or a cationic-polymerizable group, more preferably a radical-polymerizable group.

The polymerizable compound may have one polymerizable-group species alone or may have two or more polymerizable-group species.

The radical-polymerizable group is preferably an ethylenically unsaturated group, more preferably at least one selected from the group consisting of a (meth)acryloyl group, an allyl group, a styryl group, and a vinyl group, still more preferably a (meth)acryloyl group.

Examples of the cationic-polymerizable group include an epoxy group and an oxetanyl group.

The polymerizable compound in Specified particles I may be a polymerizable monomer, or a polymerizable polymer, or a combination of a polymerizable monomer and a polymerizable polymer.

In the present disclosure, the polymerizable monomer means a polymerizable compound having a molecular weight of less than 1000; and the polymerizable polymer means a polymerizable compound having a weight-average molecular weight (Mw) of 1000 or more.

In the present disclosure, the concept of the "polymerizable polymer" encompasses what are called oligomers.

In the present disclosure, the weight-average molecular weight (Mw) is a value measured by gel permeation chromatography (GPC).

This GPC is performed using HLC-8020GPC (manufactured by Tosoh Corporation), columns that are "TSKgel GMHHR-H" and "TSKgel GMHHR-M" manufactured by Tosoh Corporation, an eluant that is THE (tetrahydrofuran), and a detector that is a differential refractive index (RI) detector, under conditions of a sample concentration of 0.45 mass %, a flow rate of 1.0 mL/min, a sample injection amount of 100 µL, and a measurement temperature of 40° C.

The calibration curve is created, in the case of using polystyrene/THF solutions, on the basis of the molecular weights and retention times of the polystyrenes. The polystyrenes used for creating the calibration curve have molecular weights of 1090000, 427000, 37900, 18700, 6200, 2500, 1010, and 495.

Specified particles I, from the viewpoint of further improving the flexibility of the overcoat-layer-equipped color image (hereafter, also simply referred to as "image"), preferably include a polymerizable polymer.

Such a term "image flexibility" means, in the case of bending a substrate having an image thereon, the degree of conformability of the image to bending of the substrate. When the image flexibility is low, upon bending of the substrate having the image thereon, the image does not conform to the bent substrate, and the image tends to crack.

The image flexibility is a property desired, for example, in the case of image formation on leather.

When Specified particles I include a polymerizable polymer, the ratio of the polymerizable polymer to the whole polymerizable compound included in the Specified particles I is preferably 30 mass % to 100 mass %, more preferably 50 mass % to 100 mass %, still more preferably 80 mass % to 100 mass %, still more preferably 90 mass % to 100 mass %.

Polymerizable Polymer

The polymerizable polymer optionally included in Specified particles I has a Mw of 1000 or more as described above.

The polymerizable polymer preferably has, from the viewpoint of further improving image flexibility, a Mw of 1500 or more, more preferably 2000 or more.

The polymerizable polymer has, from the viewpoint of, in the case of using the color ink as an ink jet color ink, ejection stability through the ink jet head (hereafter, also simply referred to as "ejection stability"), a Mw of preferably 100000 or less, more preferably 50000 or less, still more preferably 30000 or less.

The polymerizable polymer is a polymer having a polymerizable group.

Preferred examples of the polymerizable group are the same as those described above.

Examples of the polymerizable polymer include polymerizable polyurethane (specifically, a polyurethane having a polymerizable group), and polymerizable polyester (specifically, a polyester having a polymerizable group).

The polymerizable polymer, from the viewpoint of further improving, for example, image flexibility and adhesiveness of the image to the substrate (hereafter, also simply referred to as "image adhesiveness"), more preferably includes polymerizable polyurethane.

The polymerizable polymer is, from the viewpoint of dispersion stability of Specified particles I, preferably a polymer having a (meth)acryloyl group.

The polymer having a (meth)acryloyl group is more preferably urethane acrylate, epoxy acrylate, acrylic acrylate, or polyester acrylate, particularly preferably urethane acrylate.

The urethane acrylate is an example of the above-described polymerizable polyurethane. The polyester acrylate is an example of the above-described polymerizable polyester.

The number of functional groups of the polymerizable polymer (specifically, the number of polymerizable groups) is, from the viewpoint of further improving image flexibility and image rubfastness, preferably 1 to 200, more preferably 2 to 200.

Hereafter, the number of functional groups that is 1 may be referred to as "monofunctional"; and the number of functional groups that is n (n is an integer of 2 or more (preferably 2 to 200)) may be referred to as "n-functional".

In the present disclosure, the number of functional groups of the polymerizable polymer means an average number of functional groups per molecule of the polymerizable polymer.

When the functional groups in the polymerizable polymer are ethylenically unsaturated groups (specifically, groups including an ethylenically double bond; for example, (meth)acryloyl groups), the number of functional groups in the polymerizable polymer is determined in the following manner.

On the basis of $^1$H-NMR measurement results, the number of ethylenically double bonds per unit mass of the polymerizable polymer is determined.

GPC is performed to measure the weight-average molecular weight (Mw) of the polymerizable polymer; on the basis of the measured Mw, the number of molecules per unit mass of the polymerizable polymer is determined.

On the basis of the number of ethylenically double bonds per unit mass of the polymerizable polymer and the number of molecules per unit mass of the polymerizable polymer, the number of ethylenically double bonds per molecule of the polymerizable polymer (specifically, the number of functional groups of the polymerizable polymer) is determined.

In EXAMPLES described later, the number of functional groups of the polymerizable polymer was determined under the following conditions.

The $^1$H-NMR measurement for determining the number of ethylenically double bonds per unit mass of the polymerizable polymer was performed using 0.125 mL of an aqueous dispersion liquid of the polymerizable polymer (measurement target), and 0.5 mL of an acetone-$d_6$ solution of DMSO (dimethyl sulfoxide) (internal standard substance).

The $^1$H-NMR measurement was performed using "AVANCE III HD600" manufactured by Bruker.

In the acetone-$d_6$ solution of DMSO, the DMSO concentration was set such that 6 mL of the whole solution contains 2 mg of DMSO.

The number of ethylenically double bonds per unit mass of the polymerizable polymer was determined on the basis of the area of the peak corresponding to ethylenically double bonds (the peak being in the range of 5.8 ppm to 6.5 ppm), and a standard calibration curve created in advance.

The standard calibration curve was created on the basis of $^1$H-NMR measurement results of an acetone-$d_6$ solution of lauryl acrylate (standard) (lauryl acrylate concentration: 2.6 mg/0.625 mL), and an acetone-$d_6$ solution of lauryl acrylate (standard) (lauryl acrylate concentration: 8.9 mg/0.625 mL).

As the polymerizable polymer, commercially available products may be used.

Examples of the commercially available products of polymerizable polyurethane (specifically, urethane acrylate) include:

Shikoh (registered trademark) UV-7630B (manufactured by The Nippon Synthetic Chemical Industry Co., Ltd.), and Genomer (registered trademark) 4215 (manufactured by Rahn AG).

Examples of the commercially available products of polymerizable polyester (specifically, polyester acrylate) include ARONIX M-6100, ARONIX M-6250, ARONIX M-6500, ARONIX M-7100, ARONIX M-7300K, and M-8030 (manufactured by TOAGOSEI CO., LTD., polyester acrylates).

For example, the color ink that contains Specified particles I including a polymerizable polymer may be produced from a commercially available product of an aqueous dispersion liquid containing polymerizable polymer particles (specifically, particles composed of a polymerizable polymer).

Examples of the commercially available product of the aqueous dispersion liquid containing urethane acrylate particles serving as the polymerizable polymer particles include:

LIODURAS (registered trademark) AQ2016 NPI, LIODURAS AQ2017 NPI (all manufactured by TOYOCHEM CO., LTD.);

HYDRAN (registered trademark) 100A, HYDRAN 100B, HYDRAN 100S (all manufactured by DIC Corporation);

TAKELAC (registered trademark) WR-620, TAKELAC WR-640 (all manufactured by Mitsui Chemicals, Inc.);

UCECOAT (registered trademark) 7571, UCECOAT 7849, UCECOAT 7655, UCECOAT 7770, UCECOAT 7773 (all manufactured by DAICEL-ALLNEX LTD.);

BEAMSET (registered trademark) EM90, BEAMSET EM94 (all manufactured by ARAKAWA CHEMICAL INDUSTRIES, LTD.); and WBR-832DA (manufactured by Taisei Fine Chemical Co., Ltd.).

Polymerizable Monomer

The polymerizable monomer optionally included in Specified particles I is a polymerizable compound having a molecular weight of less than 1000 as described above.

Thus, the polymerizable monomer has a molecular weight of less than 1000.

The polymerizable monomer preferably has a molecular weight of 900 or less, more preferably 800 or less, still more preferably 700 or less.

The lower limit of the molecular weight of the polymerizable monomer is, for example, 100.

The number of functional groups of the polymerizable monomer (specifically, the number of polymerizable groups) is, from the viewpoint of further improving image flexibility, preferably 1 to 6, more preferably 1 to 3, still more preferably 1 or 2, particularly preferably 1.

The polymerizable monomer optionally included in Specified particles I may be of one species alone or two or more species.

The polymerizable monomer, from the viewpoint of further improving image flexibility, preferably includes a monofunctional polymerizable monomer (specifically, a polymerizable monomer in which the number of functional groups is 1).

The polymerizable monomer, from the viewpoint of further improving image flexibility and rubfastness, preferably includes a monofunctional polymerizable monomer and a di- to hexa-functional polymerizable monomer (specifically, a polymerizable monomer in which the number of functional groups is 2 to 6), more preferably includes a monofunctional polymerizable monomer, and a bifunctional or trifunctional polymerizable monomer.

Examples of the polymerizable monomer include:
monofunctional (meth)acrylate compounds such as cyclic trimethylolpropane formal (meth)acrylate;
bifunctional (meth)acrylate compounds such as polyethylene glycol di(meth)acrylate, and 3-methyl-1,5-pentanediol di(meth)acrylate;
trifunctional acrylate compounds such as trimethylolpropane tri(meth)acrylate, and ethylene oxide- (EO-) modified trimethylolpropane tri(meth)acrylate; and
N-vinyl heterocyclic compounds such as N-vinylcaprolactam.

Other examples of the polymerizable monomer include publicly known polymerizable monomers described in, for example, WO2016/052053A (Paragraphs 0097 to 0106) and WO2018/042916A (Paragraphs 0142 to 0160).

Specified Particles I

The particle size of Specified particles I is, from the viewpoint of dispersion stability of Specified particles I, preferably 300 nm or less, more preferably 200 nm or less, still more preferably 150 nm or less.

The lower limit of the particle size of Specified particles I is not particularly limited.

The lower limit of the particle size is, for example, 10 nm, 20 nm, or 50 nm.

In the present disclosure, the particle size of Specified particles I means a volume-average particle size measured by a light scattering method. The same applies to the particle size of Specified particles O described later.

The measurement of the volume-average particle size (particle size) by the light scattering method is performed using a particle-size-distribution measurement apparatus (for example, LA-960 manufactured by HORIBA, Ltd.).

The color ink according to the present disclosure containing Specified particles I can be produced by using, for example, an aqueous dispersion liquid containing Specified particles I and serving as the raw material for the color ink. In this case, the aqueous dispersion liquid containing Specified particles I and other components such as a colorant are mixed together to thereby produce the color ink.

Alternatively, at the stage of producing the aqueous dispersion liquid containing Specified particles I, the color ink according to the present disclosure may be directly produced as the aqueous dispersion liquid containing Specified particles I.

Examples of the method for obtaining the aqueous dispersion liquid containing Specified particles I include:

a method of subjecting a hydrophobic phase including a polymerizable compound to emulsification in water using a surfactant, to thereby obtain an aqueous dispersion liquid containing particles including the polymerizable compound (namely, Specified particles I); and a method of performing emulsion polymerization to synthesize a polymerizable polymer, to obtain an aqueous dispersion of Specified particles I including the polymerizable polymer.

In the former case, preferably, ethyl acetate or the like is used as an auxiliary solvent, and, after the emulsification, the solvent is driven off to remove the ethyl acetate, to thereby obtain an aqueous dispersion liquid containing Specified particles I.

As the aqueous dispersion liquid containing Specified particles I, the above-described commercially available products of the aqueous dispersion liquid containing polymerizable polymer particles can be employed.

Preferred Polymerizable Compound Content

The polymerizable compound content of the color ink relative to the total amount of the color ink is preferably 1 mass % to 30 mass %, more preferably 2 mass % to 20 mass %, still more preferably 3 mass % to 15 mass %.

The polymerizable compound content of the color ink relative to the total solid content of Specified particles I is preferably 30 mass % to 100 mass %, more preferably 50 mass % to 100 mass %.

The total solid content of Specified particles I means, in a case where Specified particles I include no solvent, the total amount of Specified particles I, or, in a case where Specified particles I include a solvent, the total amount of Specified particles I except for the solvent.

Colorant

The color ink contains at least one colorant.

The colorant is not particularly limited, may be a pigment or a dye, and is preferably a pigment from the viewpoint of light resistance.

When the color ink contains a pigment, the pigment is preferably contained, in the color ink, as particles other than Specified particles I (specifically, particles including a polymerizable compound).

The pigment is not particularly limited, and can be appropriately selected in accordance with the purpose; examples include publicly known organic pigments and inorganic pigments, resin particles dyed with dyes, commercially available pigment dispersions and surface-treated pigments (for example, pigments dispersed in dispersion media such as water, liquid compounds, or insoluble resins, and pigments surface-treated with, for example, a resin or a pigment derivative).

Examples of the organic pigments and inorganic pigments include yellow pigments, red pigments, magenta pigments, blue pigments, cyan pigments, green pigments, orange pigments, purple pigments, brown pigments, black pigments, and white pigments.

When a pigment is used as the colorant, a pigment dispersing agent may be used as needed.

When a pigment is used as the colorant, as the pigment, a self-dispersible pigment having hydrophilic groups on the surfaces of pigment particles may be used.

For the pigment and the pigment dispersing agent, reference can be appropriately made to Paragraphs 0180 to 0200 of JP2014-040529A, and Paragraphs 0122 to 0129 of WO2016/052053A.

The colorant content of the color ink relative to the total amount of the color ink is preferably 0.1 mass % to 20 mass %, more preferably 0.5 mass % to 20 mass %, still more preferably 1 mass % to 10 mass %.

Water

The color ink contains water.

The water content of the color ink relative to the total amount of the color ink is preferably 30 mass % or more, more preferably 40 mass % or more, still more preferably 50 mass % or more.

The upper limit of the water content of the color ink may be, though it depends on the amount of other components, for example, 98 mass % or less, preferably 90 mass % or less.

Polymerization Initiator

The color ink preferably contains at least one polymerization initiator.

The polymerization initiator is preferably a photopolymerization initiator.

The photopolymerization initiator is preferably a compound that absorbs light (namely, actinic energy rays) to generate a radical serving as a polymerization initiation species.

Examples of the photopolymerization initiator include:
carbonyl compounds (such as aromatic ketones; for example, IRGACURE (registered trademark) series 369, 907, 1173, and 2959 manufactured by BASF),
acylphosphine oxide compounds (such as IRGACURE 819 manufactured by BASF, and DAROCURE (registered trademark) TPO manufactured by BASF), and
polymeric photopolymerization initiators (such as Omnipol series TX and 9210 manufactured by LAMBSON Limited; SPEEDCURE 7005, 7010, and 7040 manufactured by LAMBSON Limited).

Other examples of the photopolymerization initiator include aromatic onium salt compounds, organic peroxides, thio compounds, hexaaryl biimidazole compounds, ketoxime ester compounds, borate compounds, azinium compounds, metallocene compounds, active ester compounds, compounds having a carbon-halogen bond, and alkylamine compounds.

Other examples of the photopolymerization initiator include compounds also referred to as sensitizers.

Examples of the compounds also referred to as sensitizers include benzophenone, thioxanthone, isopropylthioxanthone (ITX), anthraquinone, 3-acylcoumarin derivative, terphenyl, styryl ketone, 3-(aroylmethylene)thiazoline, camphorquinone, eosine, rhodamine, and erythrosine.

Other preferred examples of the compounds also referred to as sensitizers include compounds represented by General formula (i) in JP2010-24276A, and compounds represented by General formula (I) in JP1994-107718A (JP-H6-107718A).

For the photopolymerization initiator, for example, reference can be appropriately made to publicly known documents such as WO2016/052053A (Paragraphs 0090 to 0096, Paragraphs 0131 to 0132, and 0139 to 0147), and WO2018/042916A (Paragraphs 0169 to 0179, and 0182 to 0183).

When the color ink contains a polymerization initiator, the polymerization initiator in the color ink may be
present in a form of being contained within Specified particles I (specifically, particles including a polymerizable compound),
present in a form of adsorbing onto the surfaces of Specified particles I,
present in a form of forming particles other than Specified particles I, or
present in a form of dissolving in the color ink.

Such a polymerization initiator in the color ink may be present in forms satisfying two or more of the above-described forms.

The same applies to, of components described later, the forms of included components other than a water-soluble organic solvent.

For example, when the polymerization initiator has water-solubility, the polymerization initiator may be contained in a form of dissolving in the color ink.

In the present disclosure, "water-solubility" means a property of having a solubility of more than 1 g in 100 g of distilled water at 25° C.

The polymerization initiator optionally contained in the color ink is preferably a compound represented by Formula (X) below.

The compound represented by Formula (X) below can be contained in a form of dissolving in the color ink.

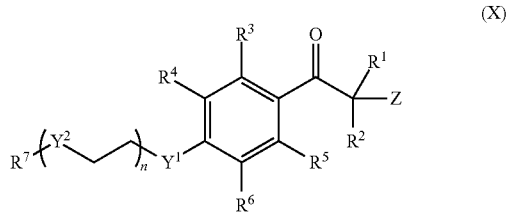

(X)

In Formula (X), $R^1$ and $R^2$ each independently represent an alkyl group; $R^3$, $R^4$, $R^5$, and $R^6$ each independently represent a hydrogen atom or a substituent; $R^7$ represents a hydrogen atom, an alkyl group, an acyl group, or a trialkylsilyl group; Z represents a hydroxy group, an alkoxy group, or an alkylamino group; $Y^1$ and $Y^2$ each independently represent an oxygen atom or a sulfur atom; and n represents an integer of 1 to 3.

In Formula (X), $R^1$ and $R^2$ each independently represent an alkyl group.

The alkyl groups represented by $R^1$ and $R^2$ may be linear or branched.

In the alkyl groups represented by $R^1$ and $R^2$, the number of carbon atoms is preferably 1 to 10, more preferably 1 to 5, still more preferably 1 to 3, still more preferably 1 or 2.

$R^1$ and $R^2$ may be linked together to form a ring. The ring structure group formed by linking together of $R^1$ and $R^2$ is preferably a cycloalkyl group. The cycloalkyl group is preferably cycloheptyl or cyclohexyl.

In Formula (X), $R^3$, $R^4$, $R^5$, and $R^6$ each independently represent a hydrogen atom or a substituent.

At least one of $R^3$, $R^4$, $R^5$, or $R^6$ is preferably a hydrogen atom. More preferably, two or more of $R^3$, $R^4$, $R^5$, and $R^6$ are hydrogen atoms; still more preferably, at least two of $R^3$, $R^4$ and $R^5$ are hydrogen atoms.

Still more preferably, three or more of $R^3$, $R^4$, $R^5$, and $R^6$ are hydrogen atoms; still more preferably, $R^3$, $R^4$, and $R^5$ are hydrogen atoms; still more preferably, all of $R^3$, $R^4$, $R^5$, and $R^6$ are hydrogen atoms.

The substituents represented by $R^3$, $R^4$, $R^5$, and $R^6$ are, for example, groups selected from the group consisting of an alkyl group (preferably, an alkyl group having 1 to 5 carbon atoms, more preferably, an alkyl group having 1 to 3 carbon atoms, still more preferably, an alkyl group having 1 or 2 carbon atoms), a halogen atom (for example, a fluorine atom, a chlorine atom, a bromine atom, or an iodine atom), an amino group, a hydroxy group, a cyano group, a nitro group, a carboxy group, a sulfo group, a sulfonyl group, a phosphonyl group, a borate group, an alkoxy group, and an amide group. In particular, preferred are methyl, ethyl, and halogen atoms.

In Formula (X), $R^7$ represents a hydrogen atom, an alkyl group (preferably, an alkyl group having 1 to 10 carbon atoms, more preferably, an alkyl group having 1 to 5 carbon atoms, still more preferably, an alkyl group having 1 to 3 carbon atoms), an acyl group (preferably, an acyl group having 2 to 10 carbon atoms, more preferably, an acyl group having 2 to 6 carbon atoms, still more preferably, an acyl group having 2 to 4 carbon atoms), or a trialkylsilyl group (a trialkylsilyl group in which each alkyl group of the trialkylsilyl group preferably has 1 to 10, more preferably 1 to 5, still more preferably 1 or 2 carbon atoms).

In Formula (X), Z represents a hydroxy group, an alkoxy group (preferably, an alkoxy group having 1 to 10 carbon atoms, more preferably, an alkoxy group having 1 to 5 carbon atoms, still more preferably, an alkoxy group having 1 to 3 carbon atoms), or an alkylamino group (including a dialkylamino group; each alkyl group of the alkylamino group preferably has 1 to 10, more preferably 1 to 5, still more preferably 1 to 3 carbon atoms).

In Formula (X), $Y^1$ and $Y^2$ each independently represent an oxygen atom or a sulfur atom, more preferably an oxygen atom.

In Formula (X), n is an integer of 1 to 3.

Specific examples of the compound represented by Formula (X) include the following Compounds (1-1) to (1-3).

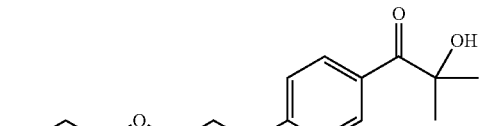

(1-1)

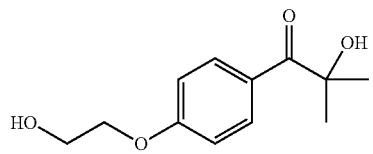

(1-2)

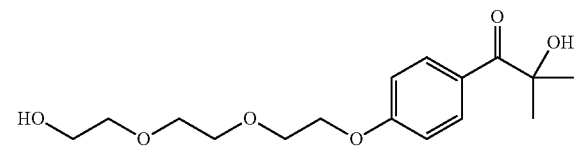

(1-3)

When the color ink contains a polymerization initiator, the polymerization initiator content of the color ink relative to the total amount of the color ink is preferably 0.01 mass % to 15 mass %, more preferably 0.1 mass % to 10 mass %, still more preferably 0.1 mass % to 5 mass %.

Water-Soluble Organic Solvent

The color ink may contain a water-soluble organic solvent.

When the color ink contains a water-soluble organic solvent, the type and/or content of the water-soluble organic solvent can be appropriately selected, to thereby adjust the viscosity of the color ink.

When the color ink contains a water-soluble organic solvent, in the case of using the color ink as an ink jet color ink, further improved ejection stability through the ink jet head is achieved.

When the color ink contains a water-soluble organic solvent, the water-soluble organic solvent content relative to the total amount of the color ink is preferably 1 mass % to 40 mass %, more preferably 5 mass % to 35 mass %.

Specific examples of the water-soluble organic solvent are as follows:
- alcohols (for example, methanol, ethanol, propanol, isopropanol, butanol, isobutanol, secondary butanol, tertiary butanol, pentanol, hexanol, cyclohexanol, and benzyl alcohol),
- polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol),
- polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether),
- amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine),
- amides (for example, formamide, N,N-dimethylformamide, and N,N-dimethylacetamide),
- heterocyclic compounds (for example, 2-pyrrolidone, N-methyl-2-pyrrolidone, cyclohexylpyrrolidone, 2-oxazolidone, 1,3-dimethyl-2-imidazolidinone, and γ-butyrolactone),
- sulfoxides (for example, dimethyl sulfoxide),
- sulfones (for example, sulfolane), and
- others (for example, urea, acetonitrile, and acetone).

Surfactant

The color ink may contain at least one surfactant.

The surfactant has a function of, for example, a surface tension modifier for modifying the surface tension of the color ink.

The surfactant is a compound having a structure intramolecularly having a hydrophilic portion and a hydrophobic portion; more specifically, examples include anionic surfactants, cationic surfactants, amphoteric surfactants, nonionic surfactants, and betaine-based surfactants.

In particular, preferred are nonionic surfactants or anionic surfactants.

Other examples of the surfactant include:
- compounds described as surfactants in JP1984-157636A (JP-S59-157636A), pages 37 to 38 and Research Disclosure No. 308119 (1989);
- fluorine-based (fluorinated-alkyl-based) surfactants described in patent publications of JP2003-322926A, JP2004-325707A, and JP2004-309806A; and
- silicone-based surfactants.

As the surfactant, preferred are fluorine-based surfactants or acetylene glycol-based surfactants, and more preferred are fluorine-based surfactants.

As the fluorine-based surfactants, preferred are fluorine-based nonionic surfactants having a fluoroalkyl group in a hydrophobic portion.

The fluoroalkyl group is preferably a perfluoroalkyl group.

More specifically, the fluorine-based nonionic surfactants are preferably, for example, perfluoroalkyl carboxylic acids, fluorotelomer alcohols, and perfluoro(polyoxyalkylene alkyl ether), more preferably perfluoroalkyl carboxylic acids.

As the surfactant, commercially available products may be used.

Examples of commercially available products of the fluorine-based surfactants include:
- SURFLON (registered trademark) series (such as SURFLON S-242 and S-243) manufactured by AGC SEIMI CHEMICAL CO., LTD.; and
- CAPSTONE (registered trademark) FS-63 manufactured by E. I. du Pont de Nemours and Company.

When the color ink contains a surfactant, the surfactant content of the color ink is appropriately set in consideration of the surface tension of the color ink.

The surfactant content of the color ink relative to the total amount of the color ink is preferably 0.001 mass % to 5 mass %, more preferably 0.005 to 3 mass %, still more preferably 0.01 mass % to 2 mass %.

Polymerization Inhibitor

The color ink may contain at least one polymerization inhibitor.

Examples of the polymerization inhibitor include p-methoxyphenol, quinones (for example, hydroquinone, benzoquinone, and methoxybenzoquinone), phenothiazine, catechols, alkylphenols (for example, dibutylhydroxytoluene (BHT)), alkylbisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), and tris(N-nitroso-N-phenylhydroxylamine) aluminum salt (synonym: cupferron Al).

Of these, preferred is at least one selected from the group consisting of p-methoxyphenol, catechols, quinones, alkylphenols, TEMPO, TEMPOL, and tris(N-nitroso-N-phenylhydroxylamine) aluminum salt; and more preferred is at least one selected from the group consisting of p-methoxyphenol, hydroquinone, benzoquinone, BHT, TEMPO, TEMPOL, and tris(N-nitroso-N-phenylhydroxylamine) aluminum salt.

When the color ink contains a polymerization inhibitor, the polymerization inhibitor content of the color ink is appropriately selected, but is, relative to the total amount of the color ink, preferably 0.0001 mass % to 1 mass %, more preferably 0.01 mass % to 1 mass %.

Polymer not Having any Polymerizable Group

The color ink may contain at least one polymer not having any polymerizable group.

Examples of the polymer not having any polymerizable group include epoxy resins, vinyl chloride-based resins, vinyl acetate-based resins, polyesters, (meth)acrylic resins, chlorinated polyolefins, polyketones, and (meth)acrylic-modified polyorganosiloxanes.

As the polymer not having any polymerizable group, from the viewpoint of, for example, image flexibility, preferred are vinyl chloride-based resins, polyesters, (meth)acrylic resins, and (meth)acrylic-modified polyorganosiloxanes, and more preferred are vinyl chloride-based resins.

The vinyl chloride-based resins mean polymers including a structural unit derived from vinyl chloride.

Examples of the vinyl chloride-based resins include a vinyl chloride homopolymer (namely, polyvinyl chloride), a copolymer of vinyl chloride and vinyl acetate (hereafter, also referred to as "vinyl chloride-vinyl acetate copolymer"), and a copolymer of vinyl chloride and hydroxy acrylate (hereafter, also referred to as "vinyl chloride-hydroxy acrylate copolymer").

In such a vinyl chloride-based resin, the content of a structural unit derived from vinyl chloride relative to the total amount of the vinyl chloride-based resin is preferably 50 mass % or more, more preferably 60 mass % or more, still more preferably 70 mass % or more, particularly preferably 80 mass % or more.

Examples of commercially available products of the vinyl chloride-based resins include UCAR solution vinyl resins VYHD, VYHH, VMCA, VROH, and VYLF-X manufactured by The Dow Chemical Company; Solbin resins CL, CNL, C5R, and TA5R manufactured by Nissin Chemical Industry Co., Ltd.; VINNOL (registered trademark) E15/40, E15/45, H14/36, H15/42, H15/50, H11/59, H40/43, H40/50, H40/55, H40/60, H15/45M, E15/45M, and E15/40A manufactured by Wacker Chemie AG.

Examples of the (meth)acrylic resins include a copolymer of methyl methacrylate and n-butyl methacrylate.

Examples of commercially available products of the (meth)acrylic resins include Elvacite 2013 (copolymer of methyl methacrylate and n-butyl methacrylate, Mw=34000), Elvacite 2014 (copolymer of methyl methacrylate and n-butyl methacrylate, Mw=119000), Elvacite 4099 (copolymer of methyl methacrylate and n-butyl methacrylate, Mw=15000) from Lucite International; and DIANAL (registered trademark) BR-113 (butyl methacrylate resin, Mw=30000) manufactured by Mitsubishi Chemical Corporation.

Examples of commercially available products of the polyesters include a polyester resin ("TEGO (registered trademark) addbond LTH"; Mw=3000) from Evonik Japan Co., Ltd.

Examples of commercially available products of the chlorinated polyolefins include SUPERCHLON (registered trademark) 814HS from Nippon Paper Industries Co., Ltd.

Examples of commercially available products of the polyketones include TEGO (registered trademark) VARIPLUS AP, CA, and SK from Evonik Industries.

Examples of commercially available products of the (meth)acrylic-modified polyorganosiloxanes include CHALINE (registered trademark) R175S and R170 from Nissin Chemical Industry Co., Ltd.

The polymer not having any polymerizable group preferably has a weight-average molecular weight (Mw) of 3000 to 200000, more preferably 5000 to 200000, still more preferably 10000 to 150000, still more preferably 10000 to 100000, particularly preferably 10000 to 50000.

When the polymer not having any polymerizable group has a Mw of 3000 or more, further improved image flexibility is provided.

When the polymer not having any polymerizable group has a Mw of 200000 or less, the color ink has reduced viscosity and the color ink has further improved usability (for example, when the color ink is an ink jet color ink, the color ink has further improved ejection stability).

When the color ink contains a polymer not having any polymerizable group, the content of the polymer not having any polymerizable group relative to the total amount of the color ink is preferably 1 mass % to 10 mass %, more preferably 1.5 mass % to 10 mass %.

When the content of the polymer not having any polymerizable group is 1 mass % or more, image flexibility is further improved.

When the content of the polymer not having any polymerizable group is 10 mass % or less, the color ink has further reduced viscosity, and the color ink has further improved usability (for example, when the color ink is an ink jet color ink, the color ink has further improved ejection stability).

Other Components

The color ink may contain, in addition to the above-described components, other components as needed.

Examples of the other components include antioxidants, anti-fading agents, conductive salts, and basic compounds.

Preferred Surface Tension of Color Ink

The surface tension of the color ink is not particularly limited, and is appropriately adjusted.

The color ink preferably has a surface tension of 20 mN/m to 50 mN/m, more preferably 20 mN/m to 45 mN/m, still more preferably 30 mN/m to 45 mN/m.

When the color ink has a surface tension of 20 mN/m or more, excessive spreading of the color ink over the substrate is further suppressed, to provide further improved image quality of the color image (for example, image sharpness).

When the color ink has a surface tension of 50 mN/m or less, cissing of the color ink on the substrate is further suppressed.

The surface tension of the color ink means a value measured with a surface tensiometer (for example, Automatic Surface Tensiometer CBVP-Z (Kyowa Interface Science Co., Ltd.) under a condition of a liquid temperature of 25° C.

The surface tension of the color ink can be adjusted by adjusting a component in the color ink (for example, the type and/or the content of the surfactant).

Preferred Viscosity of Color Ink

The viscosity of the color ink is not particularly limited, and is appropriately adjusted.

The color ink preferably has a viscosity of 1 mPa·s to 20 mPa·s, more preferably 1 mPa·s to 20 mPa·s, still more preferably 1 mPa·s to 10 mPa·s.

When the color ink has a viscosity in such a preferred range, the color ink has further improved usability. For example, when the color ink is an ink jet color ink, the color ink has further improved ejection stability.

The viscosity of the color ink means a value measured with a viscometer (for example, VISCOMETER TV-22 (manufactured by TOKI SANGYO CO. LTD)) under a condition of a liquid temperature of 30° C.

The viscosity of the color ink can be adjusted by adjusting a component in the color ink (for example, when the color ink contains a water-soluble organic solvent, the type and/or the content of the water-soluble organic solvent).

Overcoat Solution

The overcoat solution contains particles including a polymerizable compound and water.

The overcoat solution is a solution for forming an overcoat layer covering at least the color image on the substrate.

The overcoat solution preferably does not substantially contain any colorant.

This phrase "the overcoat solution does not substantially contain any colorant" means that the overcoat solution does not contain any colorant (specifically, the colorant content relative to the total amount of the overcoat solution is 0 mass %), or, in a case where the overcoat solution contains a colorant, the colorant content relative to the total amount of the overcoat solution is less than 0.1 mass %.

Particles Including Polymerizable Compound

The overcoat solution contains particles including a polymerizable compound (hereafter, also referred to as "Specified particles O").

Specified particles O may contain one polymerizable compound alone or two or more polymerizable compounds.

Specified particles O may be particles composed of a polymerizable compound, or particles including a polymerizable compound and another component.

Preferred examples of the polymerizable compound in Specified particles O are the same as the preferred examples (having been described under the heading "Color ink") of the polymerizable compound in Specified particles I.

Preferred examples (for example, particle size) of Specified particles O are also the same as the preferred examples of Specified particles I.

The polymerizable compound content of the overcoat solution relative to the total amount of the overcoat solution is preferably 1 mass % to 50 mass %, more preferably 5 mass % to 40 mass %, still more preferably 10 mass % to 35 mass %.

The polymerizable compound content of the overcoat relative to the total solid content of Specified particles O is preferably 30 mass % to 100 mass %, more preferably 50 mass % to 100 mass %.

The percent by mass of the polymerizable compound in the overcoat solution (hereafter, also referred to as "$C_{OP}$") is preferably larger than the percent by mass of the polymerizable compound in the color ink (hereafter, also referred to as "$C_{IP}$").

In this case, the image has further improved rubfastness.

From the viewpoint of further improving the rubfastness of the image, the ratio of $C_{OP}$ to $C_{IP}$ (namely, a $C_{OP}/C_{IP}$ ratio) is preferably 1.1 to 20, more preferably 2 to 10, still more preferably 3 to 8.

Water

The overcoat solution contains water.

The water content of the overcoat solution relative to the total amount of the overcoat solution is preferably 30 mass % or more, more preferably 40 mass % or more, still more preferably 50 mass % or more.

The upper limit of the water content of the overcoat solution is, though it depends on the amounts of other components, for example, 98 mass % or less, preferably 90 mass % or less.

Polymerization Initiator

The overcoat solution preferably contains at least one polymerization initiator.

Preferred examples of the polymerization initiator optionally contained in the overcoat solution are the same as the preferred examples of the polymerization initiator optionally contained in the color ink.

Preferred contents of the polymerization initiator optionally contained in the overcoat solution are also the same as the preferred contents of the polymerization initiator optionally contained in the color ink.

A particularly preferred example of the ink set according to the present disclosure is an example in which the color ink contains at least one polymerization initiator, and the overcoat solution contains at least one polymerization initiator.

Water-Soluble Organic Solvent

The overcoat solution may contain a water-soluble organic solvent.

Preferred examples of the water-soluble organic solvent optionally contained in the overcoat solution are the same as the preferred examples of the water-soluble organic solvent optionally contained in the color ink.

Preferred contents of the water-soluble organic solvent optionally contained in the overcoat solution are also the same as the preferred contents of the water-soluble organic solvent optionally contained in the color ink.

Surfactant

The overcoat solution may contain at least one surfactant.

Preferred examples of the surfactant optionally contained in the overcoat solution are the same as the preferred examples of the surfactant optionally contained in the color ink.

Preferred contents of the surfactant optionally contained in the overcoat solution are also the same as the preferred contents of the surfactant optionally contained in the color ink.

However, the type and the content of the surfactant optionally contained in the overcoat solution, and the type and the content of the surfactant optionally contained in the color ink may be adjusted such that a surface tension difference [color ink−overcoat solution] described later becomes more than 0.

Polymerization Inhibitor

The overcoat solution may contain at least one polymerization inhibitor.

Preferred examples of the polymerization inhibitor optionally contained in the overcoat solution are the same as the preferred examples of the polymerization inhibitor optionally contained in the color ink.

Preferred contents of the polymerization inhibitor optionally contained in the overcoat solution are also the same as the preferred contents of the polymerization inhibitor optionally contained in the color ink.

Polymer not Having any Polymerizable Group

The overcoat solution may contain at least one polymer not having any polymerizable group.

Preferred examples of the "polymer not having any polymerizable group" optionally contained in the overcoat solution are the same as the preferred examples of the "polymer not having any polymerizable group" optionally contained in the color ink.

Preferred contents of the "polymer not having any polymerizable group" optionally contained in the overcoat solution are also the same as the preferred contents of the "polymer not having any polymerizable group" optionally contained in the color ink.

Other Components

The overcoat solution may contain, in addition to the above-described components, other components as needed.

Examples of the other components include antioxidants, anti-fading agents, conductive salts, and basic compounds.

Preferred Viscosity of Overcoat Solution

The viscosity of the overcoat solution is not particularly limited, and is appropriately adjusted.

Preferred ranges and measurement method of the viscosity of the overcoat solution are respectively the same as the preferred ranges and measurement method of the viscosity of the color ink.

The viscosity of the overcoat solution can be adjusted by adjusting a component of the overcoat solution (for example, when the overcoat solution contains a water-soluble organic solvent, the type and/or the content of the water-soluble organic solvent).

Preferred Surface Tension of Overcoat Solution

The surface tension of the overcoat solution is not particularly limited, and is appropriately adjusted.

The overcoat solution has a surface tension (specifically, a surface tension at a liquid temperature of 25° C.) of preferably 10 mN/m to 40 mN/m, more preferably 15 mN/m to 35 mN/m, still more preferably 20 mN/m to 30 mN/m.

When the overcoat solution has a surface tension of 40 mN/m or less, the overcoat layer covering the color image has further improved coverage.

When the overcoat solution has a surface tension of 10 mN/m or more, the overcoat solution has further improved production suitability.

The measurement method of the surface tension of the overcoat solution is the same as the measurement method of the surface tension of the color ink.

The surface tension of the overcoat solution can be adjusted by adjusting a component of the overcoat solution (for example, the type and/or the content of the surfactant).

The overcoat solution preferably has a surface tension (specifically, a surface tension at a liquid temperature of 25° C. Hereafter, the same definition.) lower than the surface tension (specifically, a surface tension at a liquid temperature of 25° C. Hereafter, the same definition.) of the color ink. Stated another way, a value obtained by subtracting the surface tension of the overcoat solution from the surface tension of the color ink (hereafter, also referred to as "surface tension difference [color ink–OC solution]") is preferably more than 0 mN/m.

When the surface tension difference [color ink–OC solution] is more than 0 mN/m, the overcoat layer covering the color image has further improved coverage (hereafter, also referred to as "OC coverage"). The reason for this is inferred that the overcoat solution has further improved spreadability over the color image.

From the viewpoint of further improving OC coverage, the surface tension difference [color ink–OC solution] is 1 mN/m or more, more preferably 2 mN/m or more.

From the viewpoint of OC coverage, the upper limit of the surface tension difference [color ink–OC solution] is not particularly limited.

From the viewpoint of production suitability of the color ink and the overcoat solution, the surface tension difference [color ink–OC solution] is preferably 30 mN/m or less, more preferably 20 mN/m or less.

Aggregating Solution

The ink set according to the present disclosure may include an aggregating solution containing water and an aggregating agent for aggregating a component of the color ink.

When the ink set includes the aggregating solution, the aggregating solution aggregates a component of the color ink on the substrate, to thereby achieve further improved image quality (for example, sharpness) of the resultant image.

The aggregating solution is preferably applied onto, before application of the color ink onto the substrate, a region of the substrate onto which the color ink is to be applied.

Aggregating Agent

The aggregating solution contains at least one aggregating agent for aggregating a component of the color ink (for example, the colorant or Specified particles I).

The aggregating agent is preferably at least one selected from the group consisting of a polyvalent metal compound, an organic acid, a metal complex, and a water-soluble cationic polymer.

The aggregating agent preferably includes an organic acid.

Polyvalent Metal Compound

Examples of the polyvalent metal compound include salts of alkaline-earth metals (for example, magnesium and calcium) in group 2 of the periodic table, transition metals (for example, lanthanum) in group 3 of the periodic table, cations from group 13 (for example, aluminum) of the periodic table, and lanthanides (for example, neodymium).

Salts of these metals are preferably salts of organic acids described later, nitrates, chlorides, and thiocyanates.

In particular, preferred are calcium salts or magnesium salts of organic acids (for example, formates, acetates, and benzoates), calcium nitrate or magnesium nitrate, calcium chloride, magnesium chloride, and calcium thiocyanate or magnesium thiocyanate.

The polyvalent metal compound in the aggregating solution preferably dissociates at least partially into a polyvalent metal ion and a counter ion.

Organic Acid

The organic acid may be an organic compound having an acidic group.

Examples of the acidic group include a phosphoric acid group, a phosphonic acid group, a phosphinic acid group, a sulfuric acid group, a sulfonic acid group, a sulfinic acid group, and a carboxy group.

The acidic group is, from the viewpoint of aggregating rate of the color ink, preferably a phosphoric acid group or a carboxy group, more preferably a carboxy group.

Incidentally, the acidic group in the aggregating solution preferably dissociates at least partially.

Examples of the organic compound having a carboxy group include polyacrylic acid, acetic acid, formic acid, benzoic acid, glycolic acid, malonic acid, malic acid (preferably, DL-malic acid), maleic acid, succinic acid, glutaric acid, fumaric acid, citric acid, tartaric acid, phthalic acid, adipic acid, 4-methylphthalic acid, lactic acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, and 1,2,3-propanetricarboxylic acid. These compounds may be used alone or in combination of two or more thereof.

The organic compound having a carboxy group is, from the viewpoint of aggregating rate of the color ink, preferably a di- or higher carboxylic acid (hereafter, also referred to as polycarboxylic acid).

The polycarboxylic acid is preferably at least one selected from the group consisting of malonic acid, malic acid, maleic acid, succinic acid, glutaric acid, fumaric acid, tartaric acid, adipic acid, 4-methylphthalic acid, citric acid, and 1,2,3-propanetricarboxylic acid, more preferably at least one selected from the group consisting of malonic acid, malic acid, tartaric acid, glutaric acid, citric acid, adipic acid, and 1,2,3-propanetricarboxylic acid.

The organic acid preferably has a low pKa (for example, 1.0 to 5.0).

In this case, in the color ink, particles such as the pigment and Specified particles I dispersed and stabilized using weakly acidic functional groups such as carboxy groups are brought into contact with the organic acid compound having a lower pKa, to thereby decrease the surface charges of the particles, to achieve reduction in the dispersion stability.

Metal Complex

The metal complex is preferably a metal complex including, as a metallic element, at least one selected from the group consisting of zirconium, aluminum, and titanium.

The metal complex is preferably a metal complex including, as a ligand, at least one selected from the group consisting of acetate, acetylacetonate, methyl acetoacetate, ethyl acetoacetate, octyleneglycolate, butoxyacetylacetonate, lactate, lactate ammonium salt, and triethanolaminate.

As such metal complexes, various metal complexes are commercially available; in the present disclosure, commercially available metal complexes may be used. In addition, various organic ligands, in particular, various multidentate ligands that can form metal chelating catalysts are commercially available. Thus, a commercially available organic ligand and a metal may be combined together and the prepared metal complex may be used.

Water-Soluble Cationic Polymer

Examples of the water-soluble cationic polymer include polyallylamine, polyallylamine derivatives, poly-2-hydroxypropyldimethylammonium chloride, and poly(diallyldimethylammonium chloride).

For the water-soluble cationic polymer, reference can be appropriately made to descriptions of publicly known documents such as JP2011-042150A (in particular, Paragraph 0156) and JP2007-98610A (in particular, Paragraphs 0096 to 0108).

Examples of commercially available products of the water-soluble cationic polymer include SHALLOL (registered trademark) DC-303P, SHALLOL DC-902P (all manufactured by DAI-ICHI KOGYO SEIYAKU CO., LTD.), CATIOMASTER (registered trademark) PD-7, CATIOMASTER PD-30 (all manufactured by Yokkaichi Chemical Company Limited), and UNISENCE FPA100L (manufactured by SENKA corporation).

The aggregating agent content is not particularly limited.

From the viewpoint of aggregating rate of a component in the color ink, the aggregating agent content relative to the total amount of the aggregating solution is preferably 1 mass % to 50 mass %, more preferably 5 mass % to 40 mass %, still more preferably 10 mass % to 40 mass %, still more preferably 15 mass % to 35 mass %.

Water

The aggregating solution contains water.

The water content of the aggregating solution relative to the total amount of the aggregating solution is preferably 30 mass % or more, more preferably 40 mass % or more, still more preferably 50 mass % or more.

The upper limit of the water content of the aggregating solution is, though it depends on the other component contents, for example, 98 mass % or less, preferably 90 mass % or less.

Water-Soluble Organic Solvent

The aggregating solution may contain a water-soluble organic solvent.

Preferred examples of the water-soluble organic solvent optionally contained in the aggregating solution are the same as the preferred examples of the water-soluble organic solvent optionally contained in the color ink.

Preferred contents of the water-soluble organic solvent optionally contained in the aggregating solution are also the same as the preferred contents of the water-soluble organic solvent optionally contained in the color ink.

Surfactant

The aggregating solution may contain at least one surfactant.

Preferred examples of the surfactant optionally contained in the aggregating solution are the same as the preferred examples of the surfactant optionally contained in the color ink.

Preferred contents of the surfactant optionally contained in the aggregating solution are also the same as the preferred contents of the surfactant optionally contained in the color ink.

Other Components

The aggregating agent may contain, in addition to the above-described components, other components as needed.

Examples of the other components include resins (for example, resin particles), antioxidants, anti-fading agents, conductive salts, and basic compounds.

Preferred Surface Tension of Aggregating Solution

The surface tension of the aggregating solution is not particularly limited, and is appropriately adjusted.

The aggregating solution has a surface tension (specifically, a surface tension at a liquid temperature of 25° C.) of preferably 10 mN/m to 40 mN/m, more preferably 15 mN/m to 35 mN/m, still more preferably 20 mN/m to 30 mN/m.

The surface tension of the aggregating solution means a value measured with a surface tensiometer (for example, Automatic Surface Tensiometer CBVP-Z (Kyowa Interface Science Co., Ltd.) under a condition of a liquid temperature of 25° C.

The surface tension of the aggregating solution can be adjusted by adjusting a component of the aggregating solution (for example, in a case where the aggregating solution contains a surfactant, the type and/or the content of the surfactant).

Preferred Viscosity of Aggregating Solution

The viscosity of the aggregating solution is not particularly limited, and is appropriately adjusted.

The aggregating solution has a viscosity (specifically, a viscosity at a liquid temperature of 30° C.) of preferably 1 mPa·s to 20 mPa·s, more preferably 1 mPa·s to 20 mPa·s, still more preferably 1 mPa·s to 10 mPa·s.

The viscosity of the aggregating solution means a value measured with a viscometer (for example, VISCOMETER TV-22 (manufactured by TOKI SANGYO CO. LTD)) under a condition of a liquid temperature of 30° C.

The viscosity of the aggregating solution can be adjusted by adjusting a component of the aggregating solution (for example, in a case where the aggregating solution contains a water-soluble organic solvent, the type and/or the content of the water-soluble organic solvent).

Image Formation Method

Hereinafter, an embodiment of an image formation method using the ink set according to the present disclosure will be described; however, the present disclosure is not limited to the following embodiment.

The image formation method according to this embodiment uses the above-described ink set according to the present disclosure, and includes:

a step of applying, onto a substrate, the above-described color ink to form a color image (hereafter, also referred to as "color-image formation step"), and a step of applying, onto at least the color image on the substrate, the above-described overcoat solution to form an overcoat layer (hereafter, also referred to as "overcoat-layer formation step").

The image formation method according to the present disclosure may include, in addition to the above-described steps, another step as needed.

The image formation method according to the present disclosure enables formation of an overcoat-layer-equipped color image that has high surface-irregularity-texture retainability of retaining the surface-irregularity texture of the substrate and that has high rubfastness.

The inferential reasons for exerting such advantages are the same as those described under the heading "Ink set".

Preferred examples of the substrate are also the same as those described under the heading "Ink set".

Color-Image Formation Step

The color-image formation step is a step of applying, onto a substrate, the above-described color ink to form a color image.

As the process of applying, onto a substrate, the color ink, for example, a coating process, a printing process, or an ink jet process can be employed. In particular, from the viewpoint of enabling formation of a fine image, an ink jet process is preferred.

In the ink jet process, the mode of ejection through the ink jet head is not particularly limited.

As the ejection mode, publicly known modes can be appropriately employed: for example, a charge control mode of using an electrostatic attractive force to eject an ink; a drop-on-demand mode (pressure pulse mode) of using vibration pressure of piezoelectric elements; an acoustic ink jet mode of transforming electrical signals into acoustic beams, and applying the acoustic beams to an ink to use the radiation pressure to eject the ink; and a thermal ink jet (BUBBLE JET (registered trademark)) mode of heating an ink to generate bubbles and using the resultant pressure.

In the ink jet process, the color ink can be applied using a publicly known ink jet recording apparatus.

Examples of the recording system of the ink jet recording apparatus include a shuttle system of using a short serial head for scanning in the width direction of a substrate to achieve recording; and a line system (single pass system) of using a line head in which recording elements are arranged so as to correspond to the whole region of one side of a substrate.

In this embodiment, an ink jet recording apparatus of the shuttle system or the line system can be used.

An ink supply mechanism included in the ink jet recording apparatus includes, for example, a source tank including a color ink, supply ducts, an ink supply tank disposed immediately upstream of an ink jet head, a filter, and a piezoelectric ink jet head.

The piezoelectric ink jet head can be operated so as to eject multi-size dots of preferably 1 μL to 100 μL, more preferably 8 μL to 30 μL, at a resolution of preferably 320×320 dpi to 4,000×4,000 dpi, more preferably 400×400 dpi to 1,600×1,600 dpi, still more preferably 720×720 dpi to 1,200×1,200 dpi.

This term dpi (dot per inch) means the number of dots per 2.54 cm.

The color-image formation step preferably includes applying, onto a substrate, a color ink, drying and subsequently curing the applied color ink (hereafter, also referred to as "uncured color image"), to form a color image.

In this embodiment, an overcoat layer is formed on the cured color image.

In this case, in the finally obtained overcoat-layer-equipped color image, mixing of the color-ink component and the overcoat-solution component (in particular, mixing in the film-thickness direction) is further suppressed, to thereby achieve further improved rubfastness of the overcoat-layer-equipped color image (specifically, upon rubbing of the overcoat-layer-equipped color image, change in the density is further suppressed).

The color ink (namely, the uncured color image) can be dried by natural drying; however, from the viewpoint of an increase in the rate of image formation, heat-drying is preferred.

Such drying of the color ink means driving off of at least partially a solvent in the color ink (specifically, water and, when contained, a water-soluble organic solvent).

The heat-drying is performed at a drying temperature of preferably 40° C. to 100° C., more preferably 40° C. to 80° C., still more preferably 50° C. to 70° C. Such drying temperature means the surface temperature of the substrate.

The heat-drying is performed for a drying time of preferably 1 second or more, more preferably 5 seconds or more, particularly preferably 8 seconds or more.

The upper limit of the time of the heat-drying is not particularly limited; the upper limit is preferably 60 seconds, more preferably 30 seconds, particularly preferably 20 seconds.

The dried color ink is cured by, preferably, irradiating the dried color ink with actinic energy rays. This provides a color image cured by polymerization of the polymerizable compound.

Examples of the actinic energy rays include α-rays, γ-rays, electron beams, X-rays, ultraviolet radiation, visible light, and infrared light.

The wavelength range of the actinic energy rays is preferably 200 nm to 600 nm, more preferably 200 nm to 450 nm.

The irradiation dose of the actinic energy rays (hereafter, also referred to as "exposure dose") is preferably 1 kJ/m$^2$ to 30 kJ/m$^2$, more preferably 5 kJ/m$^2$ to 30 kJ/m$^2$, still more preferably 10 kJ/m$^2$ to 20 kJ/m$^2$.

The source of the actinic energy rays is not particularly limited and ordinary actinic-energy-ray sources such as mercury lamps, metal halide lamps, gas lasers, solid-state lasers, and GaN-based semiconductor ultraviolet-emitting devices (for example, light-emitting diodes (LED) and laser diodes (LD)) can be used.

The irradiation time for actinic energy rays is preferably 0.01 seconds to 120 seconds, more preferably 0.1 seconds to 90 seconds.

Specific examples of the irradiation system using actinic energy rays include a shuttle system in which a short serial head is equipped with an actinic-energy-ray irradiation device, and the head is used for scanning in the width direction of a substrate to achieve irradiation, and a single pass system in which actinic-energy-ray irradiation devices are arranged so as to correspond to the whole region of one side of a substrate.

For the irradiation conditions and basic irradiation method of actinic energy rays, reference may be made to publicly known documents such as JP1985-132767A (JP-S60-132767A).

Overcoat-Layer Formation Step

The overcoat-layer formation step is a step of applying, onto at least the color image on the substrate, the above-described overcoat solution to form an overcoat layer.

The overcoat solution may be applied onto the color image alone or onto the whole substrate including the color image and a region where the color image is not formed.

Preferred examples of the process of applying the overcoat solution are the same as the above-described preferred examples of the process of applying the color ink onto the substrate.

In the overcoat-layer formation step, the solid-content application amount of the overcoat solution is preferably 1 g/m$^2$ or more, more preferably 2 g/m$^2$ or more.

When the solid-content application amount of the overcoat solution is 1 g/m$^2$ or more, an overcoat layer can be formed to have a larger film thickness, so that the overcoat-layer-equipped color image has further improved rubfastness (specifically, upon rubbing, the overcoat-layer-equipped color image undergoes less change in the density).

The upper limit of the solid-content application amount of the overcoat solution is, from the viewpoint of further improving the surface-irregularity-texture retainability of the overcoat-layer-equipped color image, preferably 10 g/m², more preferably 5 g/m².

Such solid-content application amount of the overcoat solution means the application amount of the solid content of the overcoat solution applied onto the substrate.

The solid content of the overcoat solution means all the components of the overcoat solution except for the solvent (specifically, water and, when contained, a water-soluble organic solvent). The solid content of the overcoat solution includes Specified particles O.

The overcoat-layer formation step preferably includes applying, onto at least the color image on the substrate, the overcoat solution, drying and subsequently curing the applied overcoat solution (hereafter, also referred to as "uncured OC layer"), to form an overcoat layer.

In this embodiment, on at least the color image on the substrate, an overcoat layer cured by polymerization of the polymerizable compound can be formed.

This provides improved strength of the overcoat layer itself, which leads to further improved rubfastness of the overcoat-layer-equipped color image.

Preferred examples of the drying conditions and curing conditions of the overcoat solution are respectively the same as the preferred examples of the drying conditions and curing conditions of the color ink.

Aggregating-Solution Application Step

When the ink set according to the present disclosure includes the above-described aggregating solution, the image formation method according to this embodiment preferably includes, prior to the color-image formation step, an aggregating-solution application step of applying the aggregating solution onto a substrate.

In this embodiment, in the color-image formation step, onto the surface of the applied aggregating solution on the substrate, the color ink is applied, to form a color image.

As a result, on the substrate, a component of the color ink can be aggregated, so that the resultant color image has further improved image quality (for example, sharpness).

The process of applying the aggregating solution onto the substrate is the same as the above-described preferred examples of the process of applying the color ink onto the substrate.

The aggregating-solution application step may include applying the aggregating solution onto the substrate, and drying the applied aggregating solution.

Preferred examples of the drying conditions of the aggregating solution are the same as the preferred examples of the drying conditions of the color ink.

EXAMPLES

Hereinafter, the present invention will be described more specifically with reference to Examples; however, the present invention, within the spirit and scope thereof, is not limited to the following Examples.

Hereafter, "part" and "%" are based on mass unless otherwise specified.

"Water" means ion-exchanged water.

Examples 1 to 22 and Comparative Examples 1 to 14

Preparation of Ink Sets

As color inks, Yellow inks Ex1Y to Ex13Y, Magenta inks Ex1M to Ex13M, Cyan inks Ex1C to Ex13C, and Black inks Ex1K to Ex13K were individually prepared. In addition, as comparative color inks, Comparative yellow inks Cp1Y and Cp2Y, Comparative magenta inks Cp1M and Cp2M, Comparative cyan inks Cp1C and Cp2C, and Comparative black inks Cp1K and Cp2K were individually prepared.

As overcoat solutions, Overcoat solutions Ex1O to Ex13O were individually prepared. In addition, as comparative overcoat solutions, Comparative overcoat solutions Cp1O and Cp2O were individually prepared.

As an aggregating solution, Aggregating solution Ex1P was prepared.

Ink sets were prepared by, in accordance with combinations described later in Table 2-1 and Table 3-1, combining color inks and an overcoat solution, or color inks, an overcoat solution, and an aggregating solution.

Hereinafter, the yellow inks, the magenta inks, the cyan inks, the black inks, and the overcoat solutions will be sometimes respectively referred to as Y inks, M inks, C inks, K inks, and OC solutions.

The viscosities and surface tensions of the color inks and the overcoat solutions will be described later in Table 1.

The viscosities of the color inks and the overcoat solutions are viscosities measured with a VISCOMETER TV-22 (manufactured by TOKI SANGYO CO. LTD) at a liquid temperature of 30° C.

The surface tensions of the color inks and the overcoat solutions are surface tensions measured with an Automatic Surface Tensiometer CBVP-Z (Kyowa Interface Science Co., Ltd.) at a liquid temperature of 25° C.

Hereinafter, details of preparation of the liquids (specifically, the color inks, the overcoat solutions, and the aggregating solution) will be described.

Preparation of Yellow Ink Ex1Y

A solution mixture of the following components was stirred with a mixer (manufactured by Silverson, L4R) at room temperature at 5,000 rpm for 20 minutes, to prepare Yellow ink Ex1Y.

Components of Yellow Ink Ex1Y

Yellow pigment dispersion liquid (Projet Yellow APD 1000, manufactured by FUJIFILM Imaging Colorants Inc., pigment concentration: 14 mass %):
25 mass %

LIODURAS (registered trademark) AQ2017 NPI (aqueous dispersion liquid containing polymerizable polymer particles; solid content: 38 mass %; manufactured by TOYOCHEM CO., LTD.):
13 mass %

Compound (1-1) below (water-soluble photopolymerization initiator):
1 mass %

Propylene glycol (water-soluble organic solvent):
30 mass %

CAPSTONE (registered trademark) FS-63 (surfactant, manufactured by E. I. du Pont de Nemours and Company):
0.01 mass %

Water:
 the remainder of 100 mass % in total

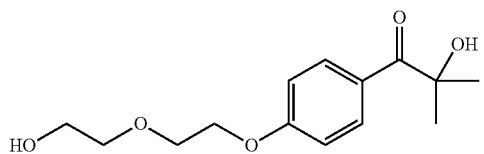
(1-1)

In LIODURAS AQ2017 NPI, the type of the polymerizable polymer, the weight-average molecular weight (Mw) of the polymerizable polymer, and the number of the functional groups of the polymerizable polymer are described, in Table 2-1, in cells of Example 1 under "Polymerizable compound or comparative compound in color ink".

The polymerizable polymer in LIODURAS AQ2017 NPI is polymerizable polyurethane (specifically, urethane acrylate).

In LIODURAS AQ2017 NPI, the polymerizable polymer particles were found to have a particle size of 146 nm.

Preparation of Magenta ink Ex1M

A solution mixture of the following components was stirred with a mixer (manufactured by Silverson, L4R) at room temperature at 5,000 rpm for 20 minutes, to prepare Magenta ink Ex1M.

Components of Magenta ink Ex1M
 Magenta pigment dispersion liquid (Projet Magenta APD 1000, manufactured by FUJIFILM Imaging Colorants Inc., pigment concentration: 14 mass %):
  40 mass %
 LIODURAS AQ2017 NPI (aqueous dispersion liquid containing polymerizable polymer particles; solid content: 38 mass %; manufactured by TOYOCHEM CO., LTD.):
  13 mass %
 Compound (1-1) above (water-soluble photopolymerization initiator):
  1 mass %
 Propylene glycol (water-soluble organic solvent):
  30 mass %
 CAPSTONE FS-63 (surfactant, manufactured by E. I. du Pont de Nemours and Company):
  0.01 mass %
 Water:
  the remainder of 100 mass % in total Preparation of Cyan Ink Ex1C A solution mixture of the following components was stirred with a mixer (manufactured by Silverson, L4R) at room temperature at 5,000 rpm for 20 minutes, to prepare Cyan ink Ex1C.

Components of Cyan Ink Ex1C
 Cyan pigment dispersion liquid (Projet Cyan APD 1000, manufactured by FUJIFILM Imaging Colorants Inc., pigment concentration: 14 mass %):
  18 mass %
 LIODURAS AQ2017 NPI (aqueous dispersion liquid containing polymerizable polymer particles; solid content: 38 mass %; manufactured by TOYOCHEM CO., LTD.):
  13 mass %
 Compound (1-1) above (water-soluble photopolymerization initiator):
  1 mass %
 Propylene glycol (water-soluble organic solvent):
  30 mass %
 CAPSTONE FS-63 (surfactant, manufactured by E. I. du Pont de Nemours and Company):
  0.01 mass %
 Water:
  the remainder of 100 mass % in total Preparation of Black Ink Ex1K A solution mixture of the following components was stirred with a mixer (manufactured by Silverson, L4R) at room temperature at 5,000 rpm for 20 minutes, to prepare Black ink Ex1K.

Components of Black Ink Ex1K
 Black pigment dispersion liquid (Projet Black APD 1000, manufactured by FUJIFILM Imaging Colorants Inc., pigment concentration: 14 mass %):
  21 mass %
 LIODURAS AQ2017 NPI (aqueous dispersion liquid containing polymerizable polymer particles; solid content: 38 mass %; manufactured by TOYOCHEM CO., LTD.):
  13 mass %
 Compound (1-1) above (water-soluble photopolymerization initiator):
  1 mass %
 Propylene glycol (water-soluble organic solvent):
  30 mass %
 CAPSTONE FS-63 (surfactant, manufactured by E. I. du Pont de Nemours and Company):
  0.01 mass %
 Water:
  the remainder of 100 mass % in total Preparation of Overcoat Solution Ex1O A solution mixture of the following components was stirred with a mixer (manufactured by Silverson, L4R) at room temperature at 5,000 rpm for 20 minutes, to prepare Overcoat solution Ex1O.

Components of Overcoat Solution Ex1O
 LIODURAS AQ2017 NPI (aqueous dispersion liquid containing polymerizable polymer particles; solid content: 38 mass %; manufactured by TOYOCHEM CO., LTD.):
  58 mass %
 Compound (1-1) above (water-soluble photopolymerization initiator):
  1 mass %
 Propylene glycol (water-soluble organic solvent):
  30 mass %
 SURFLON S-243 (surfactant, manufactured by AGC SEIMI CHEMICAL CO., LTD.):
  0.3 mass %
 Water:
  the remainder of 100 mass % in total Preparation of Aggregating Solution Ex1P A solution mixture of the following components was stirred with a mixer (manufactured by Silverson, L4R) at room temperature at 5,000 rpm for 20 minutes, to prepare Aggregating solution Ex1P.

Components of Aggregating Solution Ex1P
 RIKACID TCR-100 (1,2,3-propanetricarboxylic acid; manufactured by New Japan Chemical Co., Ltd.):
  2.0 mass %
 Malonic acid:
  9.0 mass %
 Malic acid:
  8.0 mass %
 Citric acid:
  7.0 mass %
 Propylene glycol:
  20.0 mass %

SURFLON S-243 (surfactant, manufactured by AGC SEIMI CHEMICAL CO., LTD.):
0.3 mass %
Water:
the remainder of 100 mass % in total The viscosity at a liquid temperature of 30° C. of Aggregating solution Ex1P was measured with a VISCOMETER TV-22 (manufactured by TOKI SANGYO CO. LTD), and found to be 4 mPa·s.

The surface tension at a liquid temperature of 25° C. of Aggregating solution Ex1P was measured with an Automatic Surface Tensiometer CBVP-Z (Kyowa Interface Science Co., Ltd.), and found to be 25 mN/m.

Preparation of Yellow ink Ex2Y, Magenta ink Ex2M, Cyan ink Ex2C, Black ink Ex2K, and Overcoat solution Ex2O Yellow ink Ex2Y, Magenta ink Ex2M, Cyan ink Ex2C, Black ink Ex2K, and Overcoat solution Ex2O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by AQ2016 NPI (aqueous dispersion liquid containing polymerizable polymer particles; solid content: 38 mass %; manufactured by TOYOCHEM CO., LTD.) so as to contain polymerizable polymer particles having the same mass as in LIODURAS AQ2017 NPI.

In LIODURAS AQ2016 NPI, the type of the polymerizable polymer, the weight-average molecular weight (Mw) of the polymerizable polymer, and the number of the functional groups of the polymerizable polymer are described, in Table 2-1, in cells of Example 2 under "Polymerizable compound or comparative compound in color ink".

In LIODURAS AQ2016 NPI, the polymerizable polymer is polymerizable polyurethane (specifically, urethane acrylate).

In LIODURAS AQ2016 NPI, the polymerizable polymer particles were found to have a particle size of 150 nm.

Preparation of Yellow Ink Ex3Y, Magenta Ink Ex3M, Cyan Ink Ex3C, Black Ink Ex3K, and Overcoat Solution Ex3O Yellow ink Ex3Y, Magenta ink Ex3M, Cyan ink Ex3C, Black ink Ex3K, and Overcoat solution Ex3O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by HYDRAN 100A (aqueous dispersion liquid containing polymerizable polymer particles; solid content: 34 mass %: manufactured by DIC Corporation) so as to contain polymerizable polymer particles having the same mass as in LIODURAS AQ2017 NPI, and the amount of water was adjusted such that mass % of components other than water and the pigment dispersion liquid remained the same.

In HYDRAN 100A, the type of the polymerizable polymer, the weight-average molecular weight (Mw) of the polymerizable polymer, and the number of the functional groups of the polymerizable polymer are described, in Table 2-1, in cells of Example 3 under "Polymerizable compound or comparative compound in color ink".

In HYDRAN 100A, the polymerizable polymer is polymerizable polyurethane (specifically, urethane acrylate).

In HYDRAN 100A, the polymerizable polymer particles were found to have a particle size of 41 nm.

Preparation of Yellow Ink Ex4Y, Magenta Ink Ex4M, Cyan Ink Ex4C, Black Ink Ex4K, and Overcoat Solution Ex4O Yellow ink Ex4Y, Magenta ink Ex4M, Cyan ink Ex4C, Black ink Ex4K, and Overcoat solution Ex4O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by HYDRAN 100B (aqueous dispersion liquid containing polymerizable polymer particles; solid content: 36 mass %: manufactured by DIC Corporation) so as to contain polymerizable polymer particles having the same mass as in LIODURAS AQ2017 NPI, and the amount of water was adjusted such that mass % of components other than water and the pigment dispersion liquid remained the same.

In HYDRAN 100B, the type of the polymerizable polymer, the weight-average molecular weight (Mw) of the polymerizable polymer, and the number of the functional groups of the polymerizable polymer are described, in Table 2-1, in cells of Example 4 under "Polymerizable compound or comparative compound in color ink".

In HYDRAN 100B, the polymerizable polymer is polymerizable polyurethane (specifically, urethane acrylate).

In HYDRAN 100B, the polymerizable polymer particles were found to have a particle size of 85 nm.

Preparation of Yellow Ink Ex5Y, Magenta Ink Ex5M, Cyan Ink Ex5C, Black Ink Ex5K, and Overcoat Solution Ex5O Yellow ink Ex5Y, Magenta ink Ex5M, Cyan ink Ex5C, Black ink Ex5K, and Overcoat solution Ex5O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by HYDRAN 100S (aqueous dispersion liquid containing polymerizable polymer particles; solid content: 40 mass %: manufactured by DIC Corporation) so as to contain polymerizable polymer particles having the same mass as in LIODURAS AQ2017 NPI, and the amount of water was adjusted such that mass % of components other than water and the pigment dispersion liquid remained the same.

In HYDRAN 100S, the type of the polymerizable polymer, the weight-average molecular weight (Mw) of the polymerizable polymer, and the number of the functional groups of the polymerizable polymer are described, in Table 2-1, in cells of Example 5 under "Polymerizable compound or comparative compound in color ink".

In HYDRAN 100S, the polymerizable polymer is polymerizable polyurethane (specifically, urethane acrylate).

In HYDRAN 100S, the polymerizable polymer particles were found to have a particle size of 139 nm.

Preparation of Yellow Ink Ex6Y, Magenta Ink Ex6M, Cyan Ink Ex6C, Black Ink Ex6K, and Overcoat Solution Ex6O Yellow ink Ex6Y, Magenta ink Ex6M, Cyan ink Ex6C, Black ink Ex6K, and Overcoat solution Ex6O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by TAKELAC WR-620 (aqueous dispersion liquid containing polymerizable polymer particles; solid content: 43 mass %: manufactured by Mitsui Chemicals, Inc.) so as to contain polymerizable polymer particles having the same mass as in LIODURAS AQ2017 NPI, and the amount of water was adjusted such that mass % of components other than water and the pigment dispersion liquid remained the same.

In TAKELAC WR-620, the type of the polymerizable polymer, the weight-average molecular weight (Mw) of the polymerizable polymer, and the number of functional groups of the polymerizable polymer are described, in Table 2-1, in cells of Example 6 under "Polymerizable compound or comparative compound in color ink".

In TAKELAC WR-620, the polymerizable polymer is polymerizable polyurethane (specifically, urethane acrylate).

In TAKELAC WR-620, the polymerizable polymer particles were found to have a particle size of 111 nm.

Preparation of Yellow Ink Ex7Y, Magenta Ink Ex7M, Cyan Ink Ex7C, Black Ink Ex7K, and Overcoat Solution Ex7O Yellow ink Ex7Y, Magenta ink Ex7M, Cyan ink Ex7C, Black ink Ex7K, and Overcoat solution Ex7O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by TAKELAC WR-640 (aqueous dispersion liquid containing polymerizable polymer particles; solid content: 40 mass %; manufactured by Mitsui Chemicals, Inc.) so as to contain polymerizable polymer particles having the same mass as in LIODURAS AQ2017 NPI, and the amount of water was adjusted such that mass % of components other than water and the pigment dispersion liquid remained the same.

In TAKELAC WR-640, the type of the polymerizable polymer, the weight-average molecular weight (Mw) of the polymerizable polymer, and the number of the functional groups of the polymerizable polymer are described, in Table 2-1, in cells of Example 7 under "Polymerizable compound or comparative compound in color ink".

In TAKELAC WR-640, the polymerizable polymer is polymerizable polyurethane (specifically, urethane acrylate).

In TAKELAC WR-640, the polymerizable polymer particles were found to have a particle size of 94 nm.

Preparation of Yellow Ink Ex8Y

Preparation of Emulsion ExD1

The following materials were placed into a homogenizer and stirred at 10000 revolutions for 3 minutes, to obtain Emulsion ExD1P. The obtained Emulsion ExD1P was subjected to driving off of the solvent, to remove ethyl acetate. The reduction in the amount caused by driving off of the solvent (specifically, ethyl acetate) was compensated for by water, to thereby obtain Emulsion ExD1.

The obtained Emulsion ExD1 was found to have a particle size of 120 nm.

Materials of Emulsion ExD1P
- Genomer 4215 (bifunctional urethane acrylate manufactured by RAHN AG, Mw=5000):
  - 15 parts by mass
- Shikoh UV-7630B (hexafunctional urethane acrylate from The Nippon Synthetic Chemical Industry Co., Ltd., Mw=2200):
  - 15 parts by mass
- Vinnol H14/36 (vinyl chloride-vinyl acetate copolymer from Wacker Chemie AG, copolymerization mass ratio [vinyl chloride:vinyl acetate]=85.6:14.4, Mw=34000)):
  - 6 parts by mass
- IRGACURE 819 (photopolymerization initiator from BASF, bis(2,4,6-trimethylbenzoyl)-phenylphosphine oxide):
  - 3.4 parts by mass
- IRGACURE 2959 (photopolymerization initiator from BASF, 1-[4-(2-hydroxyethoxy)-phenyl]-2-hydroxy-2-methyl-1-propan-1-one):
  - 1.8 parts by mass
- IRGASTAB UV22 (from BASF, polymerization inhibitor):
  - 2 parts by mass
- Ethyl acetate:
  - 27.9 parts by mass
- Sodium dodecylbenzenesulfonate:
  - 1 part by mass
- Water:
  - 27.9 parts by mass Preparation of Yellow Ink Ex8Y A solution mixture of the following components was stirred with a mixer (manufactured by Silverson, L4R) at room temperature at 5,000 rpm for 20 minutes, to prepare Yellow ink Ex8Y.

Components of Yellow Ink Ex8Y
- Yellow pigment dispersion liquid (Projet Yellow APD 1000, manufactured by FUJIFILM Imaging Colorants Inc., pigment concentration: 14 mass %):
  - 25 mass %
- Emulsion ExD1:
  - 20 mass %
- Propylene glycol:
  - 30 mass %
- CAPSTONE FS-63 (surfactant, manufactured by E. I. du Pont de Nemours and Company):
  - 0.01 mass %
- Water:
  - the remainder of 100 mass % in total As is clear from the above-described production method, Yellow ink Ex8Y contains particles including a polymerizable urethane polymer, a vinyl chloride-vinyl acetate copolymer, and a photopolymerization initiator. The same applies to Magenta ink Ex8M, Cyan ink Ex8C, Black ink Ex8K, and Overcoat solution Ex8O described later.

Preparation of Magenta Ink Ex8M

A solution mixture of the following components was stirred with a mixer (manufactured by Silverson, L4R) at room temperature at 5,000 rpm for 20 minutes, to prepare Magenta ink Ex8M.

Components of Magenta Ink Ex8M
- Magenta pigment dispersion liquid (Projet Magenta APD 1000, manufactured by FUJIFILM Imaging Colorants Inc., pigment concentration: 14 mass %):
  - 40 mass %
- Emulsion ExD1 above:
  - 20 mass %
- Propylene glycol:
  - 30 mass %
- CAPSTONE FS-63 (surfactant, manufactured by E. I. du Pont de Nemours and Company):
  - 0.01 mass %
- Water:
  - the remainder of 100 mass % in total Preparation of Cyan Ink Ex8C A solution mixture of the following components was stirred with a mixer (manufactured by Silverson, L4R) at room temperature at 5,000 rpm for 20 minutes, to prepare Cyan ink Ex8C.

Components of Cyan Ink Ex8C
- Cyan pigment dispersion liquid (Projet Cyan APD 1000, manufactured by FUJIFILM Imaging Colorants Inc., pigment concentration: 14 mass %):
  - 18 mass %
- Emulsion ExD1 above:
  - 20 mass %
- Propylene glycol:
  - 30 mass %
- CAPSTONE FS-63 (surfactant, manufactured by E. I. du Pont de Nemours and Company):
  - 0.01 mass %
- Water:
  - the remainder of 100 mass % in total Preparation of Black Ink Ex8K A solution mixture of the following components was stirred with a mixer (manufactured by Silverson, L4R) at room temperature at 5,000 rpm for 20 minutes, to prepare Black ink Ex8K.

Components of Black Ink Ex8K
- Black pigment dispersion liquid (Projet Black APD 1000, manufactured by FUJIFILM Imaging Colorants Inc., pigment concentration: 14 mass %):
  - 21 mass %

Emulsion ExD1 above:
  20 mass %
Propylene glycol:
  30 mass %
CAPSTONE FS-63 (surfactant, manufactured by E. I. du Pont de Nemours and Company):
  0.01 mass %
Water:
  the remainder of 100 mass % in total Preparation of Overcoat Solution Ex8O A solution mixture of the following components was stirred with a mixer (manufactured by Silverson, L4R) at room temperature at 5,000 rpm for 20 minutes, to prepare Overcoat solution Ex8O.

Components of Overcoat Solution Ex8O
  Emulsion ExD1 above:
    50 mass %
  Propylene glycol:
    30 mass %
  SURFLON S-243 (surfactant, manufactured by AGC SEIMI CHEMICAL CO., LTD.):
    0.3 mass %
  Water:
    the remainder of 100 mass % in total Preparation of Yellow Ink Ex9Y, Magenta Ink Ex9M, Cyan Ink Ex9C, Black Ink Ex9K, and Overcoat Solution Ex9O Yellow ink Ex9Y, Magenta ink Ex9M, Cyan ink Ex9C, Black ink Ex9K, and Overcoat solution Ex9O were respectively prepared as in Yellow ink Ex8Y, Magenta ink Ex8M, Cyan ink Ex8C, Black ink Ex8K, and Overcoat solution Ex8O except that Emulsion ExD1 above was changed to the following Emulsion ExD2 having the same mass as in Emulsion ExD1.

Preparation of Emulsion ExD2

The following materials were placed into a homogenizer and stirred at 10000 revolutions for 3 minutes, to obtain Emulsion ExD2P. The obtained Emulsion ExD2P was subjected to driving off of the solvent, to remove ethyl acetate. The reduction in the amount caused by driving off of the solvent (specifically, ethyl acetate) was compensated for by water, to thereby obtain Emulsion ExD2.

The obtained Emulsion ExD2 was found to have a particle size of 120 nm.

Materials of Emulsion ExD2P
  N-vinylcaprolactam (monofunctional polymerizable monomer, molecular weight: 139):
    7.5 parts by mass
  EOTMPTA (trifunctional polymerizable monomer, EO-modified trimethylolpropane triacrylate, molecular weight: 600):
    1.2 parts by mass
  CTFA (monofunctional polymerizable monomer, cyclic trimethylolpropane formal acrylate, molecular weight: 200):
    26.25 parts by mass
  IRGACURE 819 (photopolymerization initiator from BASF; bis(2,4,6-trimethylbenzoyl)-phenylphosphine oxide):
    1 part by mass
  DAROCURE TPO (photopolymerization initiator from BASF; 2,4,6-trimethylbenzoyl-diphenylphosphine oxide):
    1 part by mass
  ITX (photopolymerization initiator; 2-isopropylthioxanthone):
    1 part by mass
  IRGASTAB UV22 (polymerization inhibitor from BASF):
    0.3 parts by mass
  Hydroquinone monomethyl ether (polymerization inhibitor):
    0.2 parts by mass
  Ethyl acetate:
    30 parts by mass
  Sodium dodecylbenzenesulfonate:
    1 part by mass
  Water:
    30.55 parts by mass As is clear from the above-described production method, Yellow ink Ex9Y, Magenta ink Ex9M, Cyan ink Ex9C, Black ink Ex9K, and Overcoat solution Ex9O each contain particles including a monofunctional polymerizable monomer, a trifunctional polymerizable monomer, and a photopolymerization initiator.

Preparation of Yellow ink Ex10Y, Magenta ink Ex10M, Cyan ink Ex10C, Black ink Ex10K, and Overcoat solution Ex10O Yellow ink Ex10Y, Magenta ink Ex10M, Cyan ink Ex10C, Black ink Ex10K, and Overcoat solution Ex10O were respectively prepared as in Yellow ink Ex8Y, Magenta ink Ex8M, Cyan ink Ex8C, Black ink Ex8K, and Overcoat solution Ex8O except that Emulsion ExD1 above was changed to the following Emulsion ExD3 having the same mass as in Emulsion ExD1.

Preparation of Emulsion ExD3

The following materials were placed into a homogenizer and stirred at 10000 revolutions for 3 minutes, to obtain Emulsion ExD3P. The obtained Emulsion ExD3P was subjected to driving off of the solvent, to remove ethyl acetate. The reduction in the amount caused by driving off of the solvent (specifically, ethyl acetate) was compensated for by water, to thereby obtain Emulsion ExD3.

The obtained Emulsion ExD3 was found to have a particle size of 120 nm.

Materials of Emulsion ExD3P
  SR341 (bifunctional polymerizable monomer manufactured by Sartomer, polyethylene glycol (400) diacrylate, molecular weight: 508):
    22.9 parts by mass
  SR344 (bifunctional polymerizable monomer manufactured by Sartomer, 3-methyl-1,5-pentanediol diacrylate, molecular weight: 226):
    11.35 parts by mass
  IRGACURE 819 (photopolymerization initiator from BASF; bis(2,4,6-trimethylbenzoyl)-phenylphosphine oxide):
    2.0 parts by mass
  Speedcure 7010L (photopolymerization initiator from LAMBSON Limited):
    2.0 parts by mass
  IRGASTAB UV22 (polymerization inhibitor from BASF):
    0.2 parts by mass
  Ethyl acetate:
    30 parts by mass
  Sodium dodecylbenzenesulfonate:
    1 part by mass
  Water:
    30.55 parts by mass As is clear from the above-described production method, Yellow ink Ex10Y, Magenta ink Ex10M, Cyan ink Ex10C, Black ink Ex10K, and Overcoat solution Ex10O each contain particles including a bifunctional polymerizable monomer and a photopolymerization initiator.

Preparation of Yellow Ink Ex11Y, Magenta Ink Ex11M, Cyan Ink Ex11C, and Black Ink Ex11K Yellow ink Ex11Y, Magenta ink Ex11M, Cyan ink Ex11C, and Black ink Ex11K were respectively prepared as with Yellow ink Ex1Y, Magenta ink Ex1M, Cyan ink Ex1C, and Black ink Ex1K except for the following changes.

Changes

CAPSTONE FS-63 (surfactant, 0.01 mass % relative to the total ink) in the amount of 0.01 mass % relative to the total ink was changed to SURFLON 5-243 (surfactant) in an amount of 0.3 mass % relative to the total ink, and the amount of water was adjusted such that the total mass of the ink remained the same.

In this way, the surface tensions of the inks were changed (refer to Table 1).

Preparation of Overcoat Solution Ex11O

Overcoat solution Ex11O was prepared as with Overcoat solution Ex1O except for the following changes.

Changes

SURFLON S-243 (surfactant) in the amount of 0.3 mass % relative to the total overcoat solution was changed to CAPSTONE FS-63 (surfactant) in an amount of 0.01 mass % relative to the total overcoat solution, and the amount of water was adjusted such that the total mass of the overcoat solution remained the same.

In this way, the surface tension of the overcoat solution was changed (refer to Table 1).

Preparation of Yellow Ink Ex12Y, Magenta Ink Ex12M, Cyan Ink Ex12C, and Black Ink Ex12K Yellow ink Ex12Y, Magenta ink Ex12M, Cyan ink Ex12C, and Black ink Ex12K were respectively prepared as with Yellow ink Ex1Y, Magenta ink Ex1M, Cyan ink Ex1C, and Black ink Ex1K except for the following changes.

Changes

CAPSTONE FS-63 (surfactant, 0.01 mass % relative to the total ink) in the amount of 0.01 mass % relative to the total ink was changed to SURFLON S-243 (surfactant) in an amount of 0.2 mass % relative to the total ink, and the amount of water was adjusted such that the total mass of the ink remained the same.

In this way, the surface tensions of the inks were changed (refer to Table 1).

Preparation of Overcoat Solution Ex12O

Overcoat solution Ex12O was prepared as with Overcoat solution Ex1O except for the following changes.

Changes

SURFLON 5-243 (surfactant) in the amount of 0.3 mass % relative to the total overcoat solution was changed to CAPSTONE FS-63 (surfactant) in an amount of 0.1 mass % relative to the total overcoat solution, and the amount of water was adjusted such that the total mass of the overcoat solution remained the same.

In this way, the surface tension of the overcoat solution was changed (refer to Table 1).

Preparation of Yellow Ink Ex13Y, Magenta Ink Ex13M, Cyan Ink Ex13C, Black Ink Ex13K, and Overcoat Solution Ex13O Yellow ink Ex13Y, Magenta ink Ex13M, Cyan ink Ex13C, Black ink Ex13K, and Overcoat solution Ex13O were respectively prepared as in Yellow ink Ex8Y, Magenta ink Ex8M, Cyan ink Ex8C, Black ink Ex8K, and Overcoat solution Ex8O except that Emulsion ExD1 above was changed to the following Emulsion ExD4 having the same mass as in Emulsion ExD1.

Preparation of Emulsion ExD4

The following materials were placed into a homogenizer and stirred at 10000 revolutions for 3 minutes, to obtain Emulsion ExD4P. The obtained Emulsion ExD4P was subjected to driving off of the solvent, to remove ethyl acetate. The reduction in the amount caused by driving off of the solvent (specifically, ethyl acetate) was compensated for by water, to thereby obtain Emulsion ExD4.

The obtained Emulsion ExD4 was found to have a particle size of 120 nm.

Materials of Emulsion ExD4P

ARONIX M-6500 (polymerizable polyester manufactured by TOAGOSEI CO., LTD. (specifically, bifunctional polyester acrylate), Mw=6500):
  36 parts by mass
IRGACURE 819 (photopolymerization initiator from BASF; bis(2,4,6-trimethylbenzoyl)-phenylphosphine oxide):
  3.4 parts by mass
IRGACURE 2959 (photopolymerization initiator from BASF, 1-[4-(2-hydroxyethoxy)-phenyl]-2-hydroxy-2-methyl-1-propan-1-one):
  1.8 parts by mass
IRGASTAB UV22 (polymerization inhibitor from BASF):
  2 parts by mass
Ethyl acetate:
  27.9 parts by mass
Sodium dodecylbenzenesulfonate:
  1 part by mass
Water:
  27.9 parts by mass As is clear from the above-described production method, Yellow ink Ex13Y, Magenta ink Ex13M, Cyan ink Ex13C, Black ink Ex13K, and Overcoat solution Ex13O each contain particles including a polymerizable polymer and a photopolymerization initiator.

Preparation of Comparative Yellow Ink Cp1Y, Comparative Magenta Ink Cp1M, Comparative Cyan Ink Cp1C, Comparative Black Ink Cp1K, and Comparative Overcoat Solution Cp1O Comparative yellow ink Cp1Y, Comparative magenta ink Cp1M, Comparative cyan ink Cp1C, Comparative black ink Cp1K, and Comparative overcoat solution Cp1O were respectively prepared as in Yellow ink Ex1Y, Magenta ink Ex1M, Cyan ink Ex1C, Black ink Ex1K, and Overcoat solution Ex1O except that LIODURAS AQ2017 NPI was replaced by the following aqueous dispersion of a non-polymerizable methacrylic polymer particles so as to contain the polymer particles having the same mass as in LIODURAS AQ2017 NPI.

Preparation of Aqueous Dispersion of Non-Polymerizable Methacrylic Polymer Particles Into a 2-liter three-neck flask equipped with a stirrer, a thermometer, a reflux condenser, and a nitrogen gas inlet, 360.0 g of methyl ethyl ketone was charged and heated to 75° C. Subsequently, in another vessel, 72.0 g of isobornyl methacrylate, 252.0 g of methyl methacrylate, 36.0 g of methacrylic acid, 72 g of methyl ethyl ketone, and 1.44 g of "V-601" (polymerization initiator manufactured by FUJIFILM Wako Pure Chemical Corporation, compound name: (dimethyl 2,2'-azobis(2-methylpropionate)) were mixed together to prepare a solution mixture. Into the flask charged with methyl ethyl ketone and kept at an internal temperature of 75° C., the solution mixture prepared above was added dropwise at a constant rate so as to complete the dropwise addition in 2 hours. After the completion of the dropwise addition, to this, a solution composed of 0.72 g of "V-601"

and 36.0 g of methyl ethyl ketone was added; stirring at 75° C. for 2 hours was performed; subsequently, furthermore, a solution composed of 0.72 g of "V-601" and 36.0 g of isopropanol was added; and stirring at 75° C. for 2 hours was performed. Subsequently, heating to 85° C. was performed and stirring was performed for another 2 hours, to obtain a polymer solution of an isobornyl methacrylate/methyl methacrylate/methacrylic acid (=20/70/10 [mass ratio]) copolymer.

The obtained copolymer was found to have a weight-average molecular weight (Mw) of 60,000.

Subsequently, of the obtained polymer solution, 668.3 g was weighed out; to this, 388.3 g of isopropanol and 145.7 ml of a 1 mol/L aqueous sodium hydroxide solution were added, and the reaction-vessel internal temperature was increased to 80° C. Subsequently, 720.1 g of water was added dropwise at a rate of 20 ml/min to form an aqueous dispersion; subsequently, under atmospheric pressure, the reaction-vessel internal temperature was kept at 80° C. for 2 hours, at 85° C. for 2 hours, and at 90° C. for 2 hours. Subsequently, the internal pressure of the reaction vessel was reduced, to drive off isopropanol, methyl ethyl ketone, and water in a total amount of 913.7 g, to obtain an aqueous dispersion of non-polymerizable methacrylic polymer particles having a concentration of solid contents (polymer-particle concentration) of 28.0 mass %.

Preparation of Comparative Yellow Ink Cp2Y, Comparative Magenta Ink Cp2M, Comparative Cyan Ink Cp2C, Comparative Black Ink Cp2K, and Comparative Overcoat Solution Cp2O Solution mixtures of the following components were stirred with a mixer (manufactured by Silverson, L4R) at room temperature at 5,000 rpm for 20 minutes, to prepare Comparative yellow ink Cp2Y, Comparative magenta ink Cp2M, Comparative cyan ink Cp2C, Comparative black ink Cp2K, and Comparative overcoat solution Cp2O.

Components of Comparative Yellow Ink Cp2Y
- Yellow pigment dispersion liquid (Projet Yellow APD 1000, manufactured by FUJIFILM Imaging Colorants Inc., pigment concentration: 14 mass %):
  25 mass %
- Acrylamide 1 below (bifunctional water-soluble acrylamide monomer):
  10 mass %
- Hydroxyethyl acrylamide (monofunctional water-soluble acrylamide monomer):
  10 mass %
- Polyvinylpyrrolidone (PVP K15, manufactured by ISP Japan Ltd.):
  1 mass %
- Compound (1-1) above (water-soluble photopolymerization initiator):
  1 mass %
- CAPSTONE FS-63 (surfactant, manufactured by E. I. du Pont de Nemours and Company):
  0.01 mass %
- Water:
  the remainder of 100 mass % in total Acrylamide 1

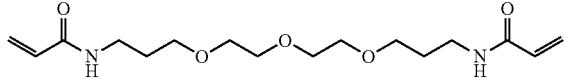

Components of Comparative Magenta Ink Cp2M
- Magenta pigment dispersion liquid (Projet Magenta APD 1000, manufactured by FUJIFILM Imaging Colorants Inc., pigment concentration: 14 mass %):
  40 mass %
- Acrylamide 1 above (bifunctional water-soluble acrylamide monomer):
  10 mass %
- Hydroxyethyl acrylamide (monofunctional water-soluble acrylamide monomer):
  10 mass %
- Polyvinylpyrrolidone (PVP K15, manufactured by ISP Japan Ltd.):
  1 mass %
- Compound (1-1) above (water-soluble photopolymerization initiator):
  1 mass %
- CAPSTONE FS-63 (surfactant, manufactured by E. I. du Pont de Nemours and Company):
  0.01 mass %
- Water:
  the remainder of 100 mass % in total Components of Comparative Cyan Ink Cp2C
- Cyan pigment dispersion liquid (Projet Cyan APD 1000, manufactured by FUJIFILM Imaging Colorants Inc., pigment concentration: 14 mass %):
  18 mass %
- Acrylamide 1 above (bifunctional water-soluble acrylamide monomer):
  10 mass %
- Hydroxyethyl acrylamide (monofunctional water-soluble acrylamide monomer):
  10 mass %
- Polyvinylpyrrolidone (PVP K15, manufactured by ISP Japan Ltd.):
  1 mass %
- Compound (1-1) above (water-soluble photopolymerization initiator):
  1 mass %
- CAPSTONE FS-63 (surfactant, manufactured by E. I. du Pont de Nemours and Company):
  0.01 mass %
- Water:
  the remainder of 100 mass % in total Components of Comparative Black Ink Cp2K
- Black pigment dispersion liquid (Projet Black APD 1000, manufactured by FUJIFILM Imaging Colorants Inc., pigment concentration: 14 mass %):
  21 mass %
- Acrylamide 1 above (bifunctional water-soluble acrylamide monomer):
  10 mass %
- Hydroxyethyl acrylamide (monofunctional water-soluble acrylamide monomer):
  10 mass %
- Polyvinylpyrrolidone (PVP K15, manufactured by ISP Japan Ltd.):
  1 mass %
- Compound (1-1) above (water-soluble photopolymerization initiator):
  1 mass %
- CAPSTONE FS-63 (surfactant, manufactured by E. I. du Pont de Nemours and Company):
  0.01 mass %
- Water:
  the remainder of 100 mass % in total Components of Comparative Overcoat Solution Cp2O
  Acrylamide 1 above (bifunctional water-soluble acrylamide monomer):
    11 mass %
  Hydroxyethyl acrylamide (monofunctional water-soluble acrylamide monomer):
    11 mass %
  Polyvinylpyrrolidone (PVP K15, manufactured by ISP Japan Ltd.):
    1 mass %
  Compound (1-1) above (water-soluble photopolymerization initiator):
    1 mass %
  SURFLON S-243 (surfactant, manufactured by AGC SEIMI CHEMICAL CO., LTD.):
    0.3 mass %
  Water:
    the remainder of 100 mass % in total Image Formation by Ink Jet Process Ink sets were prepared by, in accordance with combinations described later in Table 2-1 and Table 3-1, combining together color inks (Y ink, M ink, C ink, and K ink) and an overcoat solution, or color inks, an overcoat solution, and an aggregating solution.

In such a prepared ink set, the liquids (specifically, the color inks and the overcoat solution, or the color inks, the overcoat solution, and the aggregating solution) were used to form images.

The image formation apparatus employed was a DMP-2831 printer equipped with an ink jet head achieving an image resolution of 850 dpi×850 dpi and an ejection amount of 10 pL (picoliters) and manufactured by FUJIFILM Dimatix.

As the substrate on which the images were formed, "Cuppuccino" (synthetic-leather substrate formed of polyvinyl chloride) manufactured by YAMAPLAS CO., LTD. was employed.

Image Formation in Examples Using Ink Set Including Aggregating Solution (Refer to Table 2-1 to Table 3-2)

Aggregating-Solution Application Step

First, onto the whole surface of the synthetic-leather substrate, the aggregating solution was applied in the form of a solid image, and the applied aggregating solution was dried with a dryer. The drying conditions were a drying temperature of 70° C. and a drying time of 10 seconds.

Color-Image Formation Step

To the surface of the applied aggregating solution on the synthetic-leather substrate, the color inks were applied, to form, as uncured color images, solid images and line images. Such a line image was formed, at an image resolution of 850 dpi×850 dpi, using five adjacent nozzles. The types of the images will be described later further in detail.

Subsequently, in Table 2-2 and Table 3-2, in examples described in the "Drying and curing prior to application of OC solution" columns, as "Performed", the above-described uncured color images were subjected to drying and curing in this order.

The uncured color images were dried using a dryer under conditions of a drying temperature of 70° C. and a drying time of 10 seconds.

The dried uncured color images were cured by irradiating the dried uncured color images with ultraviolet light (wavelength range: 200 nm to 450 nm). The irradiation with ultraviolet light was performed four times using a metal halide exposure apparatus (CSOT-40: manufactured by Japan Storage Battery Co., Ltd.: 4 kW metal halide light source) under a condition of a transport speed of 10 m/min (exposure dose: 16 kJ/m$^2$).

Alternatively, in Table 2-2 and Table 3-2, examples described, in the "Drying and curing prior to application of OC solution" column, as "Not performed" (specifically, Examples 10, 12, and 14, and Comparative Example 8), the above-described uncured color images were neither subjected to the above-described drying nor the above-described curing.

Overcoat-Layer Formation Step (Only in Examples Using Ink Set Including Overcoat Solution)

In examples using ink sets including an overcoat solution (refer to Table 2-1 to Table 3-2), onto the whole surface of the synthetic-leather substrate including the cured color images (however, in Examples 10, 12, and 14 and Comparative Example 8, uncured color images), the OC solution was applied, to form an uncured OC layer.

The amount of OC solution applied was set such that the solid-content application amount of OC solution was 2.47 g/m$^2$.

Subsequently, the uncured OC layer was dried using a dryer. The drying conditions were a drying temperature of 70° C. and a drying time of 10 seconds.

Subsequently, the dried uncured OC layer was cured, to obtain an OC layer. The curing of the dried OC solution was performed under the same conditions as in the curing of the dried uncured color images.

In this way, on the synthetic-leather substrate, the color images and the OC layer (namely, OC-layer-equipped color images) were formed.

The types of color images in the formed OC-layer-equipped color images are described below.

In this description, "Three-color-black solid image" means a black solid image formed by applying Y ink, M ink, and C ink so as to overlap; and "Four-color-black solid image" means a black solid image formed by applying Y ink, M ink, C ink, and K ink so as to overlap.

Types of OC-Layer-Equipped Color Images
  Cyan solid image (image size: 5 cm×25 cm)
  Magenta solid image (image size: 5 cm×25 cm)
  Yellow solid image (image size: 5 cm×25 cm)
  Black solid image (image size: 5 cm×25 cm)
  Blue solid image (image size: 5 cm×25 cm)
  Green solid image (image size: 5 cm×25 cm)
  Red solid image (image size: 5 cm×25 cm)
  Three-color-black solid image (image size: 5 cm×25 cm)
  Four-color-black solid image (image size: 5 cm×25 cm)
  Cyan line image
  Magenta line image
  Yellow line image
  Black line image Image Formation in Examples Using Ink Set Including Overcoat Solution but not Including Aggregating Solution (Refer to Table 2-1 to Table 3-2)

The same procedures as in the above-described "Image formation in examples using ink set including aggregating solution" were performed except that the aggregating-solution application step was omitted, to form, on a synthetic-leather substrate, color images and an overcoat layer (hereafter, also referred to as "OC-layer-equipped color images").

Image Formation in Examples Using Ink Set Including Aggregating Solution but not Including Overcoat Solution (Refer to Tables 3-1 and 3-2)

The same procedures as in the above-described "Image formation in examples using ink set including aggregating solution" were performed except that the overcoat-layer formation step was omitted, to form color images on a synthetic-leather substrate.

Image Formation in Examples Using Ink Set Including Neither Overcoat Solution Nor Aggregating Solution (Refer to Tables 3-1 and 3-2)

The same procedures as in the above-described "Image formation in examples using ink set including aggregating solution but not including overcoat solution" were performed except that the aggregating-solution application step was omitted, to form color images on a synthetic-leather substrate.

Evaluations

The OC-layer-equipped color images on the synthetic-leather substrates (however, in Comparative Examples 2 to 7, 9, and 11, color images on synthetic-leather substrates), and liquids in the ink sets were used to perform the following evaluations.

The results will be described in Table 2-2 and Table 3-2.

Rubfastness of OC-Layer-Equipped Color Images

OC-layer-equipped color images (all solid images) on such a synthetic-leather substrate were subjected to the Gakushin test of being rubbed with cloth under conditions of a load of 500 g and 100 times of rubbing. On the basis of the obtained result, the following evaluation ranks were used to evaluate rubfastness of the OC-layer-equipped color images.

Of the following evaluation ranks, "A" is the highest rank in terms of rubfastness of OC-layer-equipped color images.

Evaluation Ranks of Rubfastness of OC-Layer-Equipped Color Images

A: Color transfer to the cloth used for rubbing the OC-layer-equipped color images is not observed at all, and the OC-layer-equipped color images do not undergo change in the density.

B: Slight color transfer (less than 0.05 in the color density) to the cloth used for rubbing the OC-layer-equipped color images is observed, but the OC-layer-equipped color images do not undergo change in the density.

C: Slight color transfer (0.05 or more in the color density) to the cloth used for rubbing the OC-layer-equipped color images is observed, but the OC-layer-equipped color images do not undergo change in density.

D: Color transfer to the cloth used for rubbing the OC-layer-equipped color images is observed, and the color density of the OC-layer-equipped color images decreased by less than 0.1.

E: Color transfer to the cloth used for rubbing the OC-layer-equipped color images is observed, and the color density of the OC-layer-equipped color images decreased by 0.1 or more.

Surface-Irregularity-Texture Retainability of OC-Layer-Equipped Color Images

The surfaces of OC-layer-equipped color images (all solid images) on the synthetic-leather substrate were visually inspected as to whether or not the surface-irregularity texture (grain texture) of the underlying synthetic-leather substrate was retained. On the basis of the inspection result, the following evaluation ranks were used to evaluate surface-irregularity-texture retainability of the OC-layer-equipped color images.

Of the following evaluation ranks, "A" is the higher rank in terms of surface-irregularity-texture retainability of OC-layer-equipped color images.

Evaluation Ranks of Surface-Irregularity-Texture Retainability of OC-Layer-Equipped Color Images A: In the surfaces of OC-layer-equipped color images (all solid images), the surface-irregularity texture (grain texture) of the underlying synthetic-leather substrate is retained.

B: Of the OC-layer-equipped color images, in at least some solid images, irregularities (grains) of the synthetic-leather substrate are flattened by OC-layer-equipped color images, so that the surface-irregularity texture (grain texture) of the synthetic-leather substrate is lost.

Liquid Stability of Color Inks and OC Solution

In order to simulate the oxygen-deficient conditions within an ink jet head, Y ink, M ink, C ink, K ink, and the OC solution of an ink set were individually placed into pouches having aluminum-deposited internal surfaces.

Subsequently, the pouches were left at a temperature of 30° C. for 2 weeks.

Such a pouch having been left for 2 weeks was opened, and the internal liquid (Y ink, M ink, C ink, K ink, or the OC solution) was visually inspected. On the basis of such inspection results, the following evaluation ranks were used to evaluate liquid stability of Y ink, M ink, C ink, K ink, and the OC solution in the ink set. Of the following evaluation ranks, "A" is the highest rank in terms of liquid stability of the color inks and the OC solution.

Evaluation Ranks of Liquid Stability of Color Inks and OC Solution

A: Y ink, M ink, C ink, K ink, and the OC solution each do not have precipitate, and Y ink, M ink, C ink, K ink, and the OC solution all have high liquid stability.

B: At least one of Y ink, M ink, C ink, K ink, or the OC solution has precipitate generated inferentially by polymerization.

C: Y ink, M ink, C ink, K ink, and the OC solution all have precipitate generated inferentially by polymerization.

Flexibility of OC-Layer-Equipped Color Images

A bending tester (FLEXO-METER from YASUDA SEIKI SEISAKUSHO, LTD.) was used to bend certain times a synthetic-leather substrate having the OC-layer-equipped color images. During this test, the number of times at which cracking in the OC-layer-equipped color images was observed was recorded, and the flexibility of the OC-layer-equipped color images was evaluated in accordance with the following evaluation ranks. Of the following evaluation ranks, "A" is the highest rank in terms of flexibility of the OC-layer-equipped color images.

Evaluation Ranks of Flexibility of OC-Layer-Equipped Color Images

A: No cracking occurred even at 20000 times.

B: Cracking occurred at 10000 times or more and less than 20000 times.

C: Cracking occurred at 5000 times or more and less than 10000 times.

D: Cracking occurred at 1000 times or more and less than 5000 times.

E: Cracking occurred at less than 1000 times.

OC Coverage of OC-Layer-Equipped Color Images

The surfaces of OC-layer-equipped color images (all solid images) on a synthetic-leather substrate were visually inspected, to visually inspect the state of coverage of the OC layer over the color images. On the basis of inspection result, the following evaluation ranks were used to evaluate OC coverage of the OC-layer-equipped color images.

Of the following evaluation ranks, "A" is the highest rank in terms of OC coverage of OC-layer-equipped color images.

Evaluation Ranks of OC Coverage of OC-Layer-Equipped Color Images
A: The whole color images are covered with the OC layer.
B: The OC layer over the color images has a small number of spot-shaped cissing marks.
C: The OC layer over the color images is formed in a sea-island pattern, and the color images are partially exposed.

Image Quality of OC-Layer-Equipped Color Images

Regarding OC-layer-equipped color images (all line images) on a synthetic-leather substrate, an image evaluation system (Dot Analyzer (Dot Analyzer "DA6000" manufactured by Oji Scientific Instruments) was used to measure line-image raggedness of the OC-layer-equipped color images (all line images) (specifically, relative to the ideal edges obtained by the least squares method, deviation of the edges of the line images). On the basis of the obtained result, the image quality of the OC-layer-equipped color images was evaluated in accordance with the following evaluation ranks Of the following evaluation ranks, "A" is the highest rank in terms of image quality of OC-layer-equipped color images.

Evaluation Ranks of Image Quality of OC-Layer-Equipped Color Images
A: The line-image raggedness is less than 2.0.
B: The line-image raggedness is 2.0 or more and less than 4.0.
C: The line-image raggedness is 4.0 or more and less than 6.0.
D: The line-image raggedness is 6.0 or more and less than 8.0.
E: The line-image raggedness is 8.0 or more.

Adhesiveness of OC-Layer-Equipped Color Images

OC-layer-equipped color images (all solid images) on a synthetic-leather substrate were subjected to a cross-hatch test in accordance with ISO2409 (cross-cut method); adhesiveness of the OC-layer-equipped color images was evaluated in accordance with evaluation ranks below.

In this cross-hatch test, the cutting pitch was set to 1 mm, and a lattice of 100 squares having sides of 1 mm was formed. In evaluation ranks below, the flaking square ratio (%) is a value determined by the following formula. In the following formula, the total number of squares is 100.

Flaking square ratio (%)=[(Number of flaking squares)/(Total number of squares)]×100

In this evaluation, flaking of the OC layer and at least portion of the underlying color images is regarded as "flaking square" (flaking of the OC layer alone without flaking of the color images is not regarded as "flaking square").

Evaluation Ranks of Adhesiveness of OC-Layer-Equipped Color Images
A: The flaking square ratio (%) is 0%.
B: The flaking square ratio (%) is more than 0% and 1% or less.
C: The flaking square ratio (%) is more than 1% and 5% or less.
D: The flaking square ratio (%) is more than 5%.

TABLE 1

| | | Ink No. | Ex1Y | Ex2Y | Ex3Y | Ex4Y | Ex5Y | Ex6Y | Ex7Y | Ex8Y | Ex9Y | Ex10Y | Ex11Y | Ex12Y | Ex13Y | Cp1Y | Cp2Y |
|---|---|---|---|---|---|---|---|---|---|---|---|---|---|---|---|---|---|
| Color ink | Yellow ink (Y) | Viscosity (mPa·s) | 6 | 6 | 6 | 6 | 6 | 6 | 6 | 6 | 6 | 6 | 6 | 6 | 6 | 6 | 6 |
| | | Surface tension (mN/m) | 38 | 38 | 38 | 38 | 38 | 38 | 38 | 38 | 38 | 38 | 24 | 28 | 38 | 38 | 38 |
| | Magenta ink (M) | Ink No. | Ex1M | Ex2M | Ex3M | Ex4M | Ex5M | Ex6M | Ex7M | Ex8M | Ex9M | Ex10M | Ex11M | Ex12M | Ex13M | Cp1M | Cp2M |
| | | Viscosity (mPa·s) | 6 | 6 | 6 | 6 | 6 | 6 | 6 | 6 | 6 | 6 | 6 | 6 | 6 | 6 | 6 |
| | | Surface tension (mN/m) | 38 | 38 | 38 | 38 | 38 | 38 | 38 | 38 | 38 | 38 | 24 | 28 | 38 | 38 | 38 |
| | Cyan ink (C) | Ink No. | Ex1C | Ex2C | Ex3C | Ex4C | Ex5C | Ex6C | Ex7C | Ex8C | Ex9C | Ex10C | Ex11C | Ex12C | Ex13C | Cp1C | Cp2C |
| | | Viscosity (mPa·s) | 6 | 6 | 6 | 6 | 6 | 6 | 6 | 6 | 6 | 6 | 6 | 6 | 6 | 6 | 6 |
| | | Surface tension (mN/m) | 38 | 38 | 38 | 38 | 38 | 38 | 38 | 38 | 38 | 38 | 24 | 28 | 38 | 38 | 38 |
| | Black ink (K) | Ink No. | Ex1K | Ex2K | Ex3K | Ex4K | Ex5K | Ex6K | Ex7K | Ex8K | Ex9K | Ex10K | Ex11K | Ex12K | Ex13K | Cp1K | Cp2K |
| | | Viscosity (mPa·s) | 6 | 6 | 6 | 6 | 6 | 6 | 6 | 6 | 6 | 6 | 6 | 6 | 6 | 6 | 6 |
| | | Surface tension (mN/m) | 38 | 38 | 38 | 38 | 38 | 38 | 38 | 38 | 38 | 38 | 24 | 28 | 38 | 38 | 38 |
| OC solution | OC solution No. | | Ex1O | Ex2O | Ex3O | Ex4O | Ex5O | Ex6O | Ex7O | Ex8O | Ex9O | Ex10O | Ex11O | Ex12O | Ex13O | Cp1O | Cp2O |
| | Viscosity (mPa·s) | | 6 | 6 | 6 | 6 | 6 | 6 | 6 | 6 | 6 | 6 | 6 | 6 | 6 | 6 | 6 |
| | Surface tension (mN/m) | | 24 | 24 | 24 | 24 | 24 | 24 | 24 | 24 | 24 | 24 | 38 | 34 | 24 | 24 | 24 |

TABLE 2-1

| | Ink set | | | | | | Polymerizable compound or comparative compound in color ink (common in Y, M, C, and K) | | | | Polymerizable compound or comparative compound in OC solution | | | |
|---|---|---|---|---|---|---|---|---|---|---|---|---|---|---|
| | Color ink | | | | | Aggregating solution | | | | Number of functional groups | | | | Number of functional groups |
| | Y | M | C | K | OC solution | | Type | Contained form | Mw | | Type | Contained form | Mw | |
| Example 1 | Ex1Y | Ex1M | Ex1C | Ex1K | Ex1O | Ex1P | Polymerizable polyurethane | Particles | 3100 | 28.1 | Polymerizable polyurethane | Particles | 3100 | 28.1 |
| Example 2 | Ex2Y | Ex2M | Ex2C | Ex2K | Ex2O | Ex1P | Polymerizable polyurethane | Particles | 3200 | 28.9 | Polymerizable polyurethane | Particles | 3200 | 28.9 |
| Example 3 | Ex3Y | Ex3M | Ex3C | Ex3K | Ex3O | Ex1P | Polymerizable polyurethane | Particles | 24200 | 18.7 | Polymerizable polyurethane | Particles | 24200 | 18.7 |
| Example 4 | Ex4Y | Ex4M | Ex4C | Ex4K | Ex4O | Ex1P | Polymerizable polyurethane | Particles | 16400 | 47.7 | Polymerizable polyurethane | Particles | 16400 | 47.7 |
| Example 5 | Ex5Y | Ex5M | Ex5C | Ex5K | Ex5O | Ex1P | Polymerizable polyurethane | Particles | 23100 | 145.4 | Polymerizable polyurethane | Particles | 23100 | 145.4 |
| Example 6 | Ex6Y | Ex6M | Ex6C | Ex6K | Ex6O | Ex1P | Polymerizable polyurethane | Particles | 3100 | 24 | Polymerizable polyurethane | Particles | 3100 | 24 |
| Example 7 | Ex7Y | Ex7M | Ex7C | Ex7K | Ex7O | Ex1P | Polymerizable polyurethane | Particles | 7700 | 26.5 | Polymerizable polyurethane | Particles | 7700 | 26.5 |
| Example 8 | Ex8Y | Ex8M | Ex8C | Ex8K | Ex8O | Ex1P | Polymerizable polyurethane | Particles | 2200 and 5000 | 2 and 6 | Polymerizable polyurethane | Particles | 2200 and 5000 | 2 and 6 |
| Example 9 | Ex9Y | Ex9M | Ex9C | Ex9K | Ex9O | Ex1P | Acrylate monomer | Particles | <1000 | 1 and 3 | Acrylate monomer | Particles | <1000 | 1 and 3 |
| Example 10 | Ex1Y | Ex1M | Ex1C | Ex1K | Ex1O | Ex1P | Polymerizable polyurethane | Particles | 3100 | 28.1 | Polymerizable polyurethane | Particles | 3100 | 28.1 |
| Example 11 | Ex1Y | Ex1M | Ex1C | Ex1K | Ex1O | None | Polymerizable polyurethane | Particles | 3100 | 28.1 | Polymerizable polyurethane | Particles | 3100 | 28.1 |
| Example 12 | Ex8Y | Ex8M | Ex8C | Ex8K | Ex8O | Ex1P | Polymerizable polyurethane | Particles | 2200 and 5000 | 2 and 6 | Polymerizable polyurethane | Particles | 2200 and 5000 | 2 and 6 |
| Example 13 | Ex8Y | Ex8M | Ex8C | Ex8K | Ex8O | None | Polymerizable polyurethane | Particles | 2200 and 5000 | 2 and 6 | Polymerizable polyurethane | Particles | 2200 and 5000 | 2 and 6 |
| Example 14 | Ex9Y | Ex9M | Ex9C | Ex9K | Ex9O | Ex1P | Acrylate monomer | Particles | <1000 | 1 and 3 | Acrylate monomer | Particles | <1000 | 1 and 3 |
| Example 15 | Ex9Y | Ex9M | Ex9C | Ex9K | Ex9O | None | Acrylate monomer | Particles | <1000 | 1 and 3 | Acrylate monomer | Particles | <1000 | 1 and 3 |
| Example 16 | Ex10Y | Ex10M | Ex10C | Ex10K | Ex10O | Ex1P | Acrylate monomer | Particles | <1000 | 2 | Acrylate monomer | Particles | <1000 | 2 |
| Example 17 | Ex11Y | Ex11M | Ex11C | Ex11K | Ex11O | Ex1P | Polymerizable polyurethane | Particles | 3100 | 28.1 | Polymerizable polyurethane | Particles | 3100 | 28.1 |
| Example 18 | Ex12Y | Ex12M | Ex12C | Ex12K | Ex1O | Ex1P | Polymerizable polyurethane | Particles | 3100 | 28.1 | Polymerizable polyurethane | Particles | 3100 | 28.1 |
| Example 19 | Ex1Y | Ex1M | Ex1C | Ex1K | Ex12O | Ex1P | Polymerizable polyurethane | Particles | 3100 | 28.1 | Polymerizable polyurethane | Particles | 3100 | 28.1 |
| Example 20 | Ex13Y | Ex13M | Ex13C | Ex13K | Ex13O | Ex1P | Polyester acrylate | Particles | 6500 | 2 | Polyester acrylate | Particles | 6500 | 2 |

TABLE 2-2

| | Surface tension difference [color ink-OC solution] (mN/m) | Drying and curing prior to application of OC solution | Rubfastness | Surface-irregularity-texture retainability | Liquid stability | Flexibility | OC coverage | Image quality | Adhesiveness |
|---|---|---|---|---|---|---|---|---|---|
| Example 1 | 14 | Performed | A | A | A | A | A | A | A |
| Example 2 | 14 | Performed | A | A | A | A | A | A | A |
| Example 3 | 14 | Performed | A | A | A | A | A | A | A |
| Example 4 | 14 | Performed | A | A | A | A | A | A | A |
| Example 5 | 14 | Performed | A | A | A | A | A | A | A |
| Example 6 | 14 | Performed | A | A | A | A | A | A | A |
| Example 7 | 14 | Performed | A | A | A | A | A | A | A |
| Example 8 | 14 | Performed | A | A | A | A | A | A | A |
| Example 9 | 14 | Performed | C | A | A | B | A | A | C |
| Example 10 | 14 | Not performed | B | A | A | A | A | A | A |
| Example 11 | 14 | Performed | A | A | A | A | A | B | A |
| Example 12 | 14 | Not performed | B | A | A | A | A | A | A |

TABLE 2-2-continued

|  | Surface tension difference [color ink-OC solution] (mN/m) | Drying and curing prior to application of OC solution | Rubfastness | Surface-irregularity-texture retainability | Liquid stability | Flexibility | OC coverage | Image quality | Adhesiveness |
|---|---|---|---|---|---|---|---|---|---|
| Example 13 | 14 | Performed | A | A | A | A | A | B | A |
| Example 14 | 14 | Not performed | C | A | A | B | A | A | C |
| Example 15 | 14 | Performed | C | A | A | B | A | B | C |
| Example 16 | 14 | Performed | A | A | A | D | A | A | C |
| Example 17 | −14 | Performed | B | A | A | A | C | A | A |
| Example 18 | 4 | Performed | A | A | A | A | A | A | A |
| Example 19 | 4 | Performed | A | A | A | A | A | A | A |
| Example 20 | 14 | Performed | B | A | A | A | A | A | C |

TABLE 3-1

| | Ink set | | | | | | Polymerizable compound or comparative compound in color ink (common in Y, M, C, and K) | | | | Polymerizable compound or comparative compound in OC solution | | | |
|---|---|---|---|---|---|---|---|---|---|---|---|---|---|---|
| | Color ink | | | | OC solution | Aggregating solution | Type | Contained form | Mw | Number of functional groups | Type | Contained form | Mw | Number of functional groups |
| | Y | M | C | K | | | | | | | | | | |
| Example 21 | Ex1Y | Ex1M | Ex1C | Ex1K | Ex9O | Ex1P | Polymerizable polyurethane | Particles | 3100 | 28.1 | Acrylate monomer | Particles | <1000 | 1 and 3 |
| Example 22 | Ex9Y | Ex9M | Ex9C | Ex9K | Ex1O | Ex1P | Acrylate monomer | Particles | <1000 | 1 and 3 | Polymerizable polyurethane | Particles | 3100 | 28.1 |
| Comparative Example 1 | Cp1Y | Cp1M | Cp1C | Cp1K | Cp1O | Ex1P | Non-polymerizable methacrylic polymer | Particles | 60000 | 0 | Non-polymerizable methacrylic polymer | Particles | 60000 | 0 |
| Comparative Example 2 | Ex1Y | Ex1M | Ex1C | Ex1K | None | Ex1P | Polymerizable polyurethane | Particles | 3100 | 28.1 | — | — | — | — |
| Comparative Example 3 | Ex1Y | Ex1M | Ex1C | Ex1K | None | None | Polymerizable polyurethane | Particles | 3100 | 28.1 | — | — | — | — |
| Comparative Example 4 | Ex8Y | Ex8M | Ex8C | Ex8K | None | Ex1P | Polymerizable polyurethane | Particles | 3100 | 28.1 | — | — | — | — |
| Comparative Example 5 | Ex8Y | Ex8M | Ex8C | Ex8K | None | None | Polymerizable polyurethane | Particles | 3100 | 28.1 | — | — | — | — |
| Comparative Example 6 | Ex9Y | Ex9M | Ex9C | Ex9K | None | Ex1P | Acrylate monomer | Particles | <1000 | 1 and 3 | — | — | — | — |
| Comparative Example 7 | Ex9Y | Ex9M | Ex9C | Ex9K | None | None | Acrylate monomer | Particles | <1000 | 1 and 3 | — | — | — | — |
| Comparative Example 8 | Cp1Y | Cp1M | Cp1C | Cp1K | Cp1O | Ex1P | Non-polymerizable methacrylic polymer | Particles | 60000 | 0 | Non-polymerizable methacrylic polymer | Particles | 60000 | 0 |
| Comparative Example 9 | Cp1Y | Cp1M | Cp1C | Cp1K | None | Ex1P | Non-polymerizable methacrylic polymer | Particles | 60000 | 0 | — | — | — | — |
| Comparative Example 10 | Cp1Y | Cp1M | Cp1C | Cp1K | Cp1O | None | Non-polymerizable methacrylic polymer | Particles | 60000 | 0 | Non-polymerizable methacrylic polymer | Particles | 60000 | 0 |
| Comparative Example 11 | Cp1Y | Cp1M | Cp1C | Cp1K | None | None | Non-polymerizable acrylic polymer | Particles | 60000 | 0 | — | — | — | — |

TABLE 3-1-continued

| | Ink set | | | | | | Polymerizable compound or comparative compound in color ink (common in Y, M, C, and K) | | | | Polymerizable compound or comparative compound in OC solution | | | |
|---|---|---|---|---|---|---|---|---|---|---|---|---|---|---|
| | Color ink | | | | OC solution | Aggregating solution | Type | Contained form | Mw | Number of functional groups | Type | Contained form | Mw | Number of functional groups |
| | Y | M | C | K | | | | | | | | | | |
| Comparative Example 12 | Ex1Y | Ex1M | Ex1C | Ex1K | Cp1O | Ex1P | Polymerizable polyurethane | Particles | 3100 | 28.1 | Non-polymerizable methacrylic polymer | Particles | 60000 | 0 |
| Comparative Example 13 | Cp1Y | Cp1M | Cp1C | Cp1K | Ex1O | Ex1P | Non-polymerizable methacrylic polymer | Particles | 60000 | 0 | Polymerizable polyurethane | Particles | 3100 | 28.1 |
| Comparative Example 14 | Cp2Y | Cp2M | Cp2C | Cp2K | Cp2O | None | Water-soluble acrylamide monomer | Dissolved | <1000 | 1 and 2 | Water-soluble acrylamide monomer | Dissolved | <1000 | 1 and 2 |

TABLE 3-2

| | Surface tension difference [color ink-OC solution] (mN/m) | Drying and curing prior to application of OC solution | Rubfastness | Surface-irregularity-texture retainability | Liquid stability | Flexibility | OC coverage | Image quality | Adhesiveness |
|---|---|---|---|---|---|---|---|---|---|
| Example 21 | 14 | Performed | B | A | A | A | A | A | A |
| Example 22 | 14 | Performed | B | A | A | A | A | A | C |
| Comparative Example 1 | 14 | Performed | E | A | A | B | A | A | D |
| Comparative Example 2 | — | Performed | D | A | A | A | — | A | A |
| Comparative Example 3 | — | Performed | D | A | A | A | — | B | A |
| Comparative Example 4 | — | Performed | D | A | A | A | — | A | A |
| Comparative Example 5 | — | Performed | D | A | A | A | — | B | A |
| Comparative Example 6 | — | Performed | D | A | A | B | — | A | C |
| Comparative Example 7 | — | Performed | D | A | A | B | A | B | C |
| Comparative Example 8 | 14 | Not performed | E | A | A | B | A | A | D |
| Comparative Example 9 | — | Performed | F | A | A | B | — | A | D |
| Comparative Example 10 | 14 | Performed | E | A | A | B | A | B | D |
| Comparative Example 11 | — | Performed | E | A | A | B | — | B | D |
| Comparative Example 12 | 14 | Performed | D | A | A | A | A | A | B |
| Comparative Example 13 | 14 | Performed | D | A | A | A | A | A | D |
| Comparative Example 14 | 14 | Performed | — | — | C | — | — | — | — |

Explanation of Table 2-1 to Table 3-2

In the "Contained form" columns, "Particles" mean that the liquids (color ink or OC solution) contain particles including a polymerizable compound (specifically, polymerizable polymer and/or polymerizable monomer); and "Dissolved" mean that, in the corresponding liquids, polymerizable compounds dissolve without formation of particles including the polymerizable compounds.

In the "Mw" columns, "2200 and 5000" mean that the liquids of the corresponding examples contain a polymerizable compound having a Mw of 2000 and a polymerizable compound having a Mw of 5000.

In the "Number of functional groups" columns, "1 and 3" mean that the liquids of the corresponding examples contain a monofunctional polymerizable compound and a trifunctional polymerizable compound; and "2 and 6" mean that the liquids of the corresponding examples contain a bifunctional polymerizable compound and a hexafunctional polymerizable compound.

In the evaluation-item columns, "-" mean that the corresponding evaluations were omitted.

As described in Table 2-1 to Table 3-2, in Examples 1 to 22 employing ink sets including color inks containing particles including a polymerizable compound, a colorant, and water, and an overcoat solution containing particles including a polymerizable compound and water, OC-equipped color images (hereafter, simply referred to as "images") had high rubfastness, the images had high surface-irregularity-texture retainability, and the liquids in the ink sets had high liquid stability.

In contrast to Examples, the results of Comparative Examples are as follows.

In Comparative Examples 1, 8, 10, 12, and 13 in which, in at least one of a color ink or an overcoat solution, particles in the liquid included not a polymerizable compound but a non-polymerizable polymer (comparative compound), the OC-equipped color images had low rubfastness, compared with Examples.

Also in Comparative Examples 2 to 7, 9, and 11 in which overcoat layers were not formed, the color images had low rubfastness, compared with Examples.

In Comparative Example 14 in which, in each of the color inks and the overcoat solution, the polymerizable compound (water-soluble acrylamide monomer) dissolved without formation of particles including the polymerizable compound, the liquids had low liquid stability, compared with Examples.

Comparison between Examples 9 and 21 has revealed that, in the case where the particles (Specified particles I) in the color inks include a polymerizable polymer (Example 21), the images have further improved rubfastness and flexibility.

Comparison between Examples 1 and 20 has revealed that, in the case where at least one of the polymerizable polymer in the color inks or the polymerizable polymer in the overcoat solution includes polymerizable polyurethane (Example 1), the images have further improved rubfastness.

Comparison between Examples 9 and 22 has revealed that, in the case where particles (Specified particles O) in the overcoat solution include a polymerizable polymer (Example 22), the images have further improved rubfastness and flexibility.

Comparison among Examples 1 and 17 to 19 has revealed that, in the cases where the overcoat solution has a surface tension lower than the surface tensions of the color inks (Examples 1, 18, and 19), higher OC coverage (specifically, coverage of the OC layer for the color images) is achieved.

Comparison between Examples 1 and 10 has revealed that, in the case where the color images are dried and cured prior to application of the OC solution (Example 1), the images have further improved rubfastness.

The entire contents disclosed by JP2018-207757 filed in the Japan Patent Office on Nov. 2, 2018 are incorporated herein by reference.

All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An ink set comprising:
a color ink containing particles including a polymerizable compound, a colorant, and water, and
an overcoat solution containing particles including a polymerizable compound and water,
wherein a water content of the color ink relative to a total amount of the color ink is from 30 mass % to 98 mass %,
wherein the color ink further contains a polymerization initiator and the overcoat solution further contains a polymerization initiator, and
wherein at least one of the polymerization initiator in the color ink or the polymerization initiator in the overcoat solution includes a compound represented by Formula (X) below:

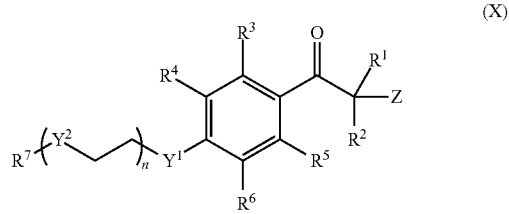

in Formula (X), $R^1$ and $R^2$ each independently represent an alkyl group; $R^3$, $R^4$, $R^5$, and $R^6$ each independently represent a hydrogen atom or a substituent; $R^7$ represents a hydrogen atom, an alkyl group, an acyl group, or a trialkylsilyl group; Z represents a hydroxy group, an alkoxy group, or an alkylamino group; $Y^1$ and $Y^2$ each independently represent an oxygen atom or a sulfur atom; and n represents an integer of 1 to 3.

2. The ink set according to claim 1, wherein the particles in the color ink include a polymerizable polymer.

3. The ink set according to claim 2, wherein the polymerizable polymer in the color ink includes polymerizable polyurethane.

4. The ink set according to claim 2, wherein the polymerizable polymer in the color ink has a weight-average molecular weight of 1000 to 30000.

5. The ink set according to claim 1, wherein the particles in the overcoat solution include a polymerizable polymer.

6. The ink set according to claim 5, wherein the polymerizable polymer in the overcoat solution includes polymerizable polyurethane.

7. The ink set according to claim 5, wherein the polymerizable polymer in the overcoat solution has a weight-average molecular weight of 1000 to 30000.

8. The ink set according to claim 1, being used for image formation on leather.

9. The ink set according to claim 1, wherein the overcoat solution has a surface tension lower than a surface tension of the color ink.

10. The ink set according to claim 1, wherein $C_{OP}$ representing a percent by mass of the polymerizable compound in the overcoat solution is larger than $C_{IP}$ representing a percent by mass of the polymerizable compound in the color ink.

11. The ink set according to claim 1, further comprising an aggregating solution containing water and an aggregating agent for aggregating a component in the color ink.

12. An image formation method using the ink set according to claim 1, the method comprising:
    applying, onto a substrate, the color ink to form a color image; and
    applying, onto at least the color image on the substrate, the overcoat solution to form an overcoat layer.

13. The image formation method according to claim 12, wherein forming the color image includes applying, onto the substrate, the color ink, drying and subsequently curing the applied color ink to form the color image, and
    forming the overcoat layer includes applying, onto at least the color image on the substrate, the overcoat solution, drying and subsequently curing the applied overcoat solution to form the overcoat layer.

14. An image formation method using the ink set according to claim 11, the method comprising:
    applying, onto a substrate, the aggregating solution;
    applying, onto a surface of the applied aggregating solution on the substrate, the color ink to form a color image; and
    applying, onto at least the color image on the substrate, the overcoat solution to form an overcoat layer.

15. The image formation method according to claim 14, wherein forming the color image includes applying, onto the surface of the applied aggregating solution on the substrate, the color ink, drying and subsequently curing the applied color ink, to form the color image, and
    forming the overcoat layer includes applying, onto at least the color image on the substrate, the overcoat solution, drying and subsequently curing the applied overcoat solution, to form the overcoat layer.

16. The image formation method according to claim 12, wherein, in forming the overcoat layer, a solid-content application amount of the overcoat solution is 1 $g/m^2$ or more.

* * * * *